US010636115B2

(12) United States Patent
Sakai

(10) Patent No.: US 10,636,115 B2
(45) Date of Patent: Apr. 28, 2020

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Tomoya Sakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/352,670

(22) Filed: Mar. 13, 2019

(65) Prior Publication Data
US 2019/0213708 A1 Jul. 11, 2019

Related U.S. Application Data

(63) Continuation of application No. PCT/JP2017/030667, filed on Aug. 28, 2017.

(30) Foreign Application Priority Data

Sep. 20, 2016 (JP) ................................. 2016-183361

(51) Int. Cl.
*G06T 3/00* (2006.01)
*H04L 29/06* (2006.01)
(Continued)

(52) U.S. Cl.
CPC ............ *G06T 3/0037* (2013.01); *G06F 13/00* (2013.01); *G06T 3/005* (2013.01); *H04L 65/607* (2013.01);
(Continued)

(58) Field of Classification Search
CPC ........ G06F 13/00; G06T 3/00; H04N 21/6377
See application file for complete search history.

(56) References Cited

U.S. PATENT DOCUMENTS

2004/0247173 A1* 12/2004 Nielsen ................. G06T 3/0062
382/154
2010/0175028 A1* 7/2010 Nozaki ............... G06F 3/04855
715/830
(Continued)

FOREIGN PATENT DOCUMENTS

JP 2016-105593 A 6/2016

OTHER PUBLICATIONS

Ruellan, et al., Accept-Push-Policy Header Field (https://tools.ietf.org/html/draft-ruellan-http-accept-push-policy-02), Jun. 2016.

*Primary Examiner* — Martin Mushambo
(74) *Attorney, Agent, or Firm* — Canon U.S.A., Inc. I.P. Division

(57) ABSTRACT

An information processing apparatus that receives image data from a server apparatus, comprising: a generation unit configured to generate a push instruction that includes identification information regarding one or more projection methods of a plurality of projection methods that are applicable to a projection target image; a transmitting unit configured to transmit a push instruction generated by the generation unit to the server apparatus; and a receiving unit configured to receive image data pushed from the server apparatus in response to a push instruction transmitted by the transmitting unit, the image data being generated by projecting a projection target image, using a projection method that is decided based on identification information that is included in the push instruction.

17 Claims, 14 Drawing Sheets

(51) Int. Cl.

| | | |
|---|---|---|
| *H04N 21/235* | (2011.01) | |
| *G06F 13/00* | (2006.01) | |
| *H04N 21/845* | (2011.01) | |
| *H04N 21/643* | (2011.01) | |
| *H04N 21/6377* | (2011.01) | |
| *H04N 21/81* | (2011.01) | |
| *H04N 21/262* | (2011.01) | |
| *H04N 21/2343* | (2011.01) | |

(52) U.S. Cl.
CPC ....... *H04L 65/608* (2013.01); *H04N 21/2353* (2013.01); *H04N 21/23439* (2013.01); *H04N 21/26258* (2013.01); *H04N 21/6377* (2013.01); *H04N 21/64322* (2013.01); *H04N 21/816* (2013.01); *H04N 21/8456* (2013.01)

(56) References Cited

U.S. PATENT DOCUMENTS

| | | | | |
|---|---|---|---|---|
| 2012/0081508 | A1* | 4/2012 | Kitazato | H04N 5/247 348/36 |
| 2012/0185607 | A1* | 7/2012 | Rhyu | H04L 67/02 709/231 |
| 2013/0223510 | A1* | 8/2013 | Coudurier | H04N 21/23439 375/240.02 |
| 2013/0326419 | A1* | 12/2013 | Harada | G06F 3/04817 715/838 |
| 2014/0096271 | A1* | 4/2014 | Wang | G06F 21/10 726/30 |
| 2014/0229529 | A1* | 8/2014 | Barone | H04L 65/4076 709/203 |
| 2014/0237536 | A1* | 8/2014 | Jang | H04N 21/43 725/131 |
| 2016/0028646 | A1* | 1/2016 | Fablet | H04L 47/80 709/226 |
| 2016/0198012 | A1* | 7/2016 | Fablet | H04L 67/26 709/231 |
| 2017/0238040 | A1* | 8/2017 | Huysegems | H04L 67/26 725/116 |
| 2017/0272691 | A1* | 9/2017 | Song | H04N 7/08 |
| 2019/0045260 | A1* | 2/2019 | Klenner | H04N 21/23805 |

\* cited by examiner

FIG. 8

```
                                                    ~1101
<?xml version="1.0" encoding="UTF-8"?>
<MPD ... >
 <Period ... >
  <AdaptationSet [...]>                          ~1102
     <SupplementalProperty schemeIdUri="urn:mpeg:dash:VR:2016" />
   <Representation [...] >[...]</Representation>
  </AdaptationSet>
  [...]
 </Period>
</MPD>
```

```
                                                    ~1103
<?xml version="1.0" encoding="UTF-8"?>
<MPD ... >
 <Period ... >
  <AdaptationSet [...]>                          ~1104
      <SupplementalProperty
 schemeIdUri="urn:mpeg:dash:VR:2016" value=" cube, 180, 120" />
     <Representation id="1" > ... </Representation>
   </AdaptationSet>
   ...
</MPD>
```

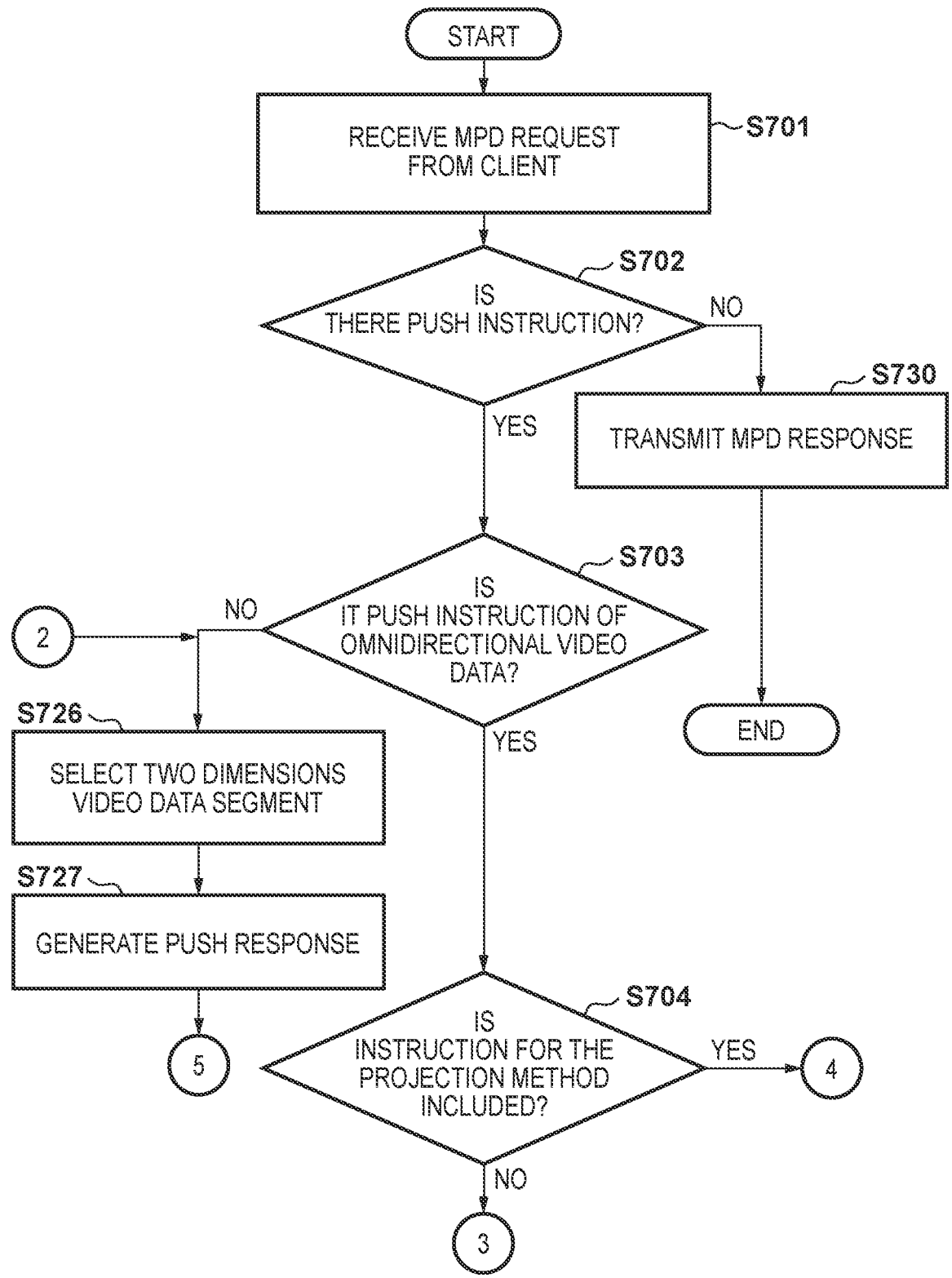

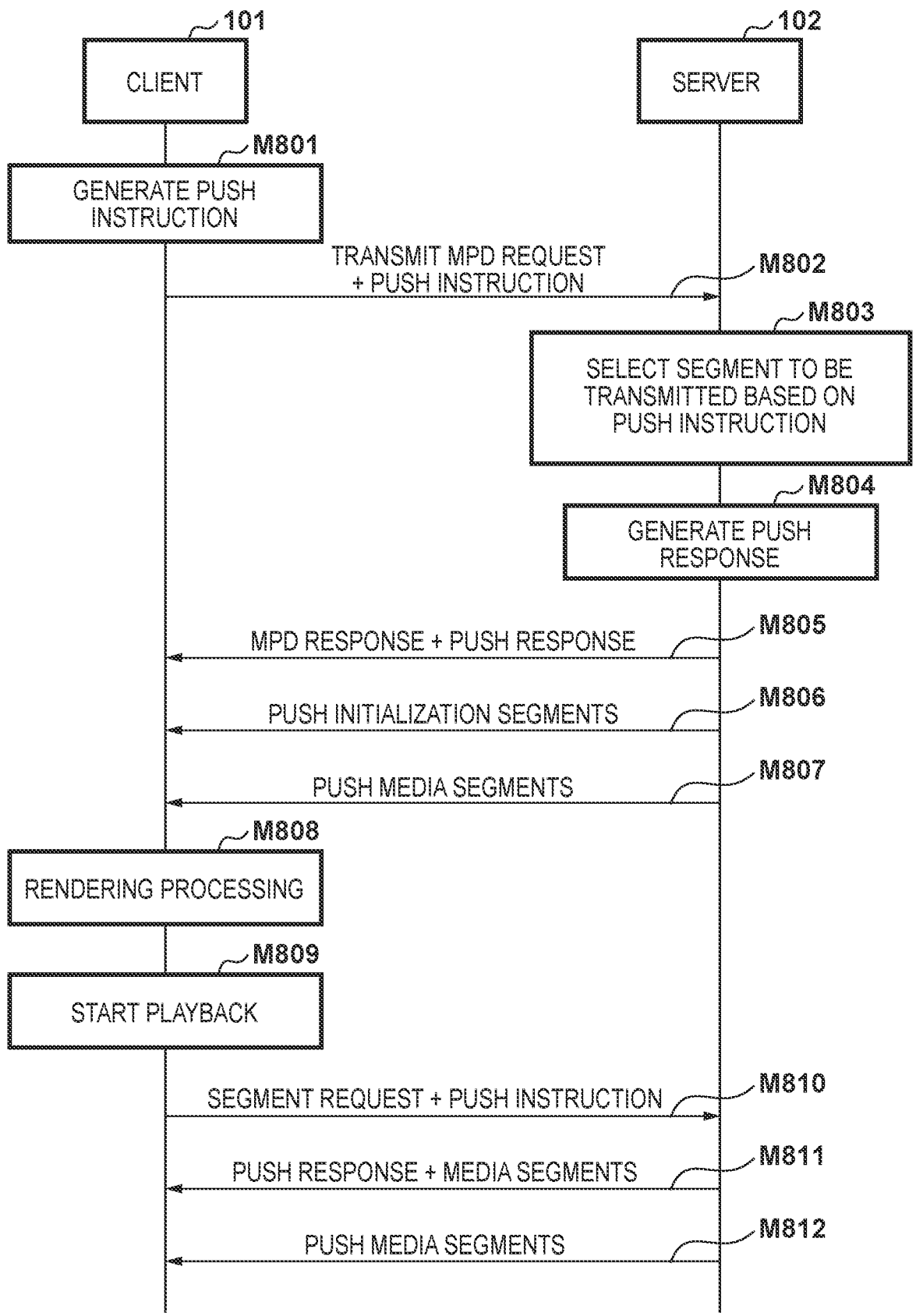

INFORMATION PROCESSING APPARATUS, METHOD FOR CONTROLLING THE SAME, AND STORAGE MEDIUM

CROSS-REFERENCE TO RELATED APPLICATIONS

This application is a Continuation of International Patent Application No. PCT/JP2017/030667, filed Aug. 28, 2017, which claims the benefit of Japanese Patent Application No. 2016-183361, filed Sep. 20, 2016, both of which are hereby incorporated by reference herein in their entirety.

BACKGROUND OF THE INVENTION

Field of the Invention

The present invention relates to an information processing apparatus, a method for controlling the same, and a storage medium, and particularly relates to a technology for transmitting image data.

Background Art

In recent years, there is provided a distribution system that distributes, to a user, in real time, omnidirectional video data captured using an omnidirectional image capturing apparatus. Patent Literature 1 discloses a system that distributes 360-degree omnidirectional video data by utilizing HTTP streaming technology.

Meanwhile, protocols such as HTTP/2 specify procedures through which a server takes the initiative to push data to a client. It is known that a delay that may occur before playback starts can be reduced by applying these procedures to HTTP streaming so that a server pushes, to the client, segments required by the client to play back a stream, despite the server not receiving a request for each individual segment.

CITATION LIST

Patent Literature

PTL1: Japanese Patent Laid-Open No. 2016-105593

When transmitting omnidirectional video data, a server can project (develop) the omnidirectional video data onto a two-dimensional plane to generate segments that are to be distributed. There are a plurality of methods for projecting omnidirectional video data onto a two-dimensional plane.

Some kinds of clients may not support display processing that is to be performed to display omnidirectional video data projected using a specific projection method. Therefore, there is a problem in which, even when a sever pushes omnidirectional video data to such a client, the client cannot play back the omnidirectional video data. Also, some kinds of clients may not support processing that is to be performed to convert omnidirectional video data projected by a server using a specific projection method to omnidirectional video data projected using another projection method. Also, in such a case, such a client cannot display omnidirectional video data projected using a desired projection method. Even if a client can convert omnidirectional video data projected by a server using a specific projection method to omnidirectional video data projected using another projection method, such conversion processing places a load on the client. It is also envisaged that, despite a client being desired to receive omnidirectional video data that has not been projected (developed), a server transmits, to the client, omnidirectional video data that has been projected using a specific projection method.

Such a problem may also occur in a case where video data other than omnidirectional video data is transmitted. For example, there are also a plurality of methods for projecting (developing) video data captured using a fish-eye lens, and video data captured using an ultra wide-angle lens. Furthermore, a similar problem occurs in the case of partial omnidirectional video data, which is omnidirectional video data from which video data of some regions has been removed. Since there are a plurality of projection methods, it can also be said that there are a plurality of display methods.

The present invention has been made in view of the above-described problem, and aims to provide technology for, when there are a plurality of methods for projecting image data, providing a client with the image data in a form that is suitable for the client.

SUMMARY OF THE INVENTION

To achieve the above-described aim, an information processing apparatus according to the present invention is provided with the following configuration. That is, an information processing apparatus that receives image data from a server apparatus, comprising: a generation unit configured to generate a push instruction that includes identification information regarding one or more projection methods of a plurality of projection methods that are applicable to a projection target image; a transmitting unit configured to transmit a push instruction generated by the generation unit to the server apparatus; and a receiving unit configured to receive image data pushed from the server apparatus in response to a push instruction transmitted by the transmitting unit, the image data being generated by projecting a projection target image, using a projection method that is decided based on identification information included in the push instruction.

Further features of the present invention will become apparent from the following description of exemplary embodiments with reference to the attached drawings.

BRIEF DESCRIPTION OF THE DRAWINGS

The attached drawings are included in DESCRIPTION, constitute a part of DESCRIPTION, show embodiments of the present invention, and are used together with descriptions of the embodiments to illustrate the principles of the present invention.

FIG. 8 is a diagram showing examples of notations in an MPD file complying with MPEG-DASH.

FIGS. 11A to 11C are flowcharts showing operations of the server.

FIG. 12 is a sequence diagram showing a sequence.

DESCRIPTION OF THE EMBODIMENTS

The following describes a communication apparatus and a communication system according to an embodiment of the present invention in detail with reference to the accompanying drawings. Note that the following embodiment does not limit the present invention that pertains to the scope of CLAIMS, and it is not necessarily true that all of the combinations of the features described in the following embodiment are essential for the present invention.

Omnidirectional Video Data

FIGS. 1A to 1D are diagrams showing an example of omnidirectional video data and examples of methods for projecting such omnidirectional data. Omnidirectional video data is, as indicated by 1001 in FIG. 1A, video data capturing a range that is centered around an origin (1003) (an azimuth angle $\varphi=0°$ to $360°$, an elevation angle $\theta=-90°$ to $90°$). Omnidirectional video data may be variously referred to as, for example, all-direction video data, virtual reality (VR) video data, 360° video data, and so on. However, the configuration of the present embodiment is applicable regardless of what it is referred to. Also, the configuration of the present embodiment is applicable to not only omnidirectional video data, but also to any kind of video data for which there are a plurality of projection methods. Although the present embodiment describes an example in which a video (a moving image) is distributed as omnidirectional image data that includes images in all directions in a three-dimensional space, a still image may be distributed instead. That is, although an expression "omnidirectional video data" is used in descriptions in the present embodiment, "omnidirectional video data" may be a video (a moving image) or a still image. Also, although the term "projection method" is used in the present embodiment, it may also be referred to as "development method" or "expression method", for example.

The range of video data to which the configuration according to the present embodiment is applicable is not limited to the range of video data specified by the azimuth angle $\varphi=0°$ to $360°$ and the elevation angle $\theta=-90°$ to $90°$ as indicated by 1001. For example, the configuration according to the present embodiment is applicable to a hemisphere specified by the azimuth angle $\varphi=0°$ to $360°$ and the elevation angle $\theta=0°$ to $90°$, or imaged data specified by any azimuth angle and any elevation angle. The configuration according to the present embodiment is also applicable to omnidirectional video data such as data for the right eye, data for the left eye, or stereoscopic data.

Figure 1A:
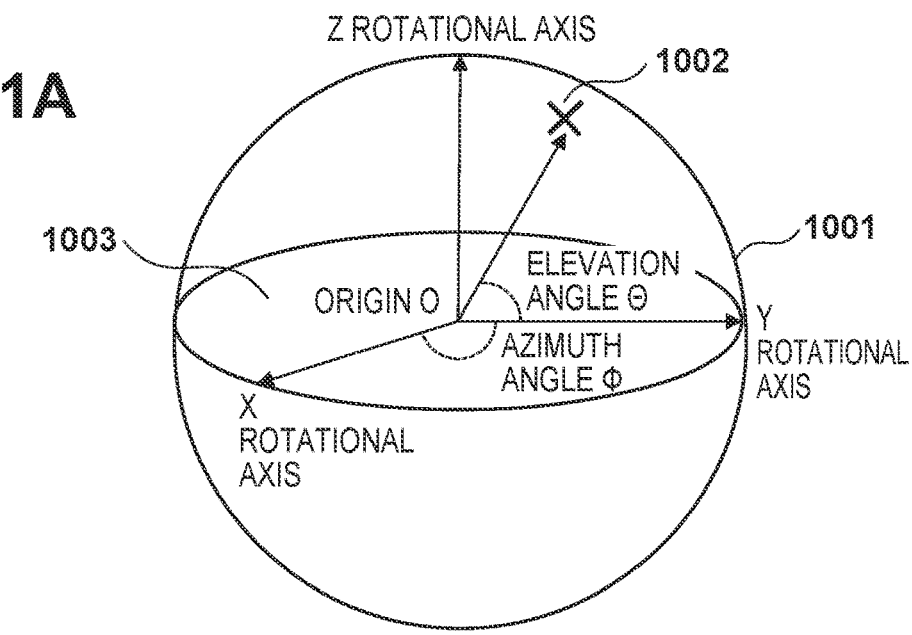
FIGS. 1A to 1D illustrate examples of omnidirectional video data projection methods.
Figure 1B:
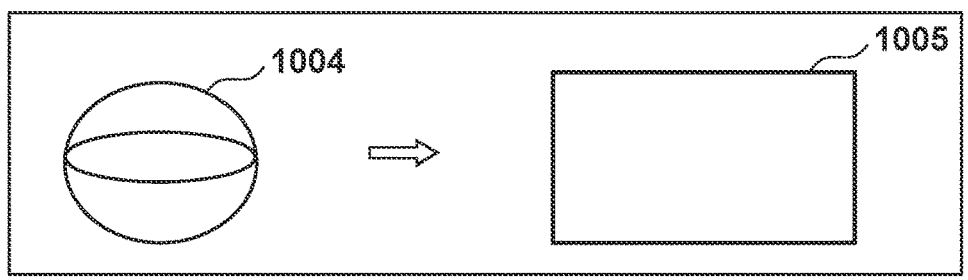
Figure 1C:
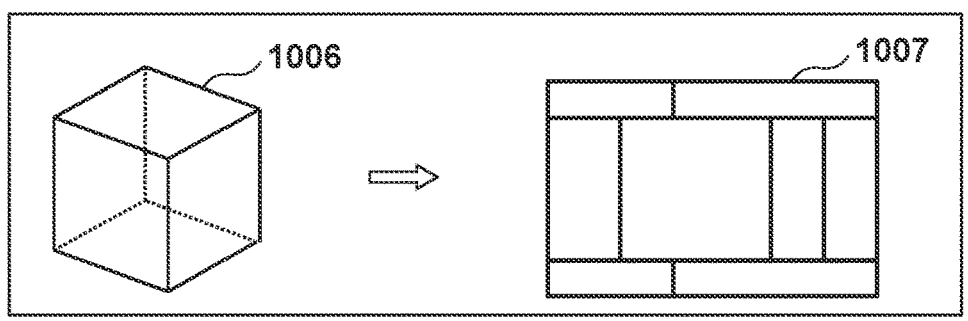
Figure 1D:
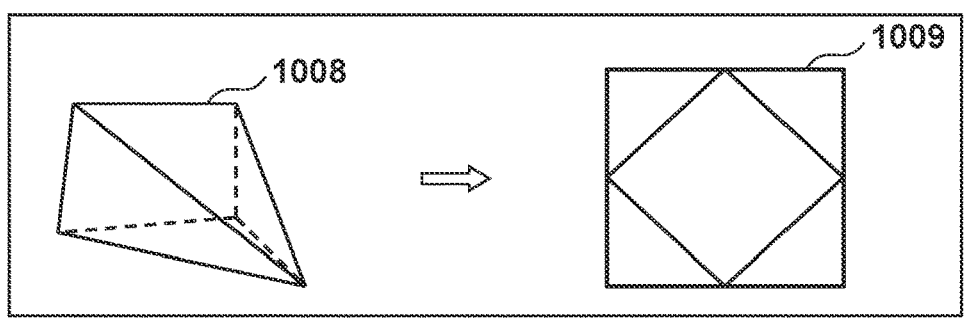

When omnidirectional video data of a captured image is to be distributed, projection processing is performed to develop the omnidirectional video data on a two-dimensional plane. There are a plurality of methods for projecting omnidirectional video data onto a two-dimensional plane. 1005 in FIG. 1B shows an equirectangular projection method, through which omnidirectional video data 1004 is projected onto a cylinder and is thus developed on a two-dimensional plane. 1007 in FIG. 1C shows a projection method (Cube) through which the omnidirectional video data 1004 is projected onto a rectangular parallelepiped 1006 and the rectangular parallelepiped 1006 is thus developed on a two-dimensional plane. 1009 in FIG. 1D shows a projection method through which the omnidirectional video data 1004 is projected onto a pyramid 1008 and the omnidirectional video data projected onto the pyramid is thus developed on a two-dimensional plane. In this way, methods for developing an omnidirectional image may include methods through which an omnidirectional image is projected onto a cylinder, a polyhedron, a cone, or the like and is thus developed on a two-dimensional plane. The present embodiment is applicable regardless of which omnidirectional video data projection method is employed. That is, the configuration according to the present embodiment is applicable to omnidirectional projection methods other than those illustrated in FIGS. 1A to 1D, such as fish-eye, cone, and regular polyhedron projection methods.

When omnidirectional video data is to be played back, rendering processing is performed on the omnidirectional video data developed on the two-dimensional plane.

The omnidirectional video data that has been subjected to projection processing is subjected to encoding processing. In the present embodiment, HEVC, AVC, VP8, VP9, and other kinds of encoding methods are also applicable. HEVC is an abbreviation of High Efficiency Video Coding, and AVC is an abbreviation of Advanced Video Coding.

The omnidirectional video data in the present embodiment may be divided into a plurality of tiles. Although methods through which omnidirectional video data is divided into tiles and encoded include a method through which each tile is individually encoded and a method that employs tile encoding to encode omnidirectional video data, the present embodiment is applicable regardless of which encoding method is employed.

In the present embodiment, LHEVC, SVC, and MVC, which are scalable encoding method, other kinds of scalable encoding methods, and hierarchical encoding method are also applicable. LHEVC is an abbreviation of Layered HEVC, SVC is an abbreviation of Scalable Video Coding, and MVC is an abbreviation of Multiview Video Coding. When hierarchical encoding is to be employed, the present embodiment is applicable even if the number of layers is two or more.

Also, the generation of a hierarchy and the division into tiles may be applied in combination. For example, a base layer, which is a low image quality layer, is not divided into tiles and is encoded so as to include the entire region of the omnidirectional video data, and an enhancement layer, which is a high image quality layer, is divided into tiles. Omnidirectional video data subjected to encoding processing is stored in a moving image container. In the present embodiment, ISOBMFF, HEVC FileFormat, MPEG2-TS, CommonMediaApplicationFormat, WebM, and other kinds of moving image container formats are applicable. "BMFF" in "ISOBMFF" is an abbreviation of Base Media File Format.

When omnidirectional video data is to be stored in a moving image container format, the omnidirectional video data is subjected to segmentation, through which the omnidirectional video data is divided into a plurality of moving image files. In the present embodiment, video data stored in a server has been segmented into a plurality of files. However, such segmentation is not essential, and video data may be stored in a single file. If video data is stored in a single file, a client acquires segments by specifying a specific range (a byte range) in the file. Also, omnidirectional video data projected onto a two-dimensional plane may be divided into a plurality of regions, and the regions may respectively be subjected to encoding, stored in a moving image container, and divided into segments. Note that segments are video data units generated by spatially or temporally dividing video data.

In the present embodiment, a plurality of different bit streams may be generated based on a single piece of omnidirectional video data in order to support combinations of a plurality of projection methods, a view angle, a resolution, and a region of interest. If this is the case, a server 102 holds segments generated by subjecting each bit stream to segmentation.

Although the present embodiment describes an example in which HTTP/2 is employed as a communication protocol, the communication protocol is not limited to HTTP/2. For example, a communication protocol such as SPDY (speedy), QUIC (Quic UDP Internet Connections), or WebSocket may be employed. Any communication protocol that has a push communication function may be employed in the present embodiment.

The present embodiment describes an example in which MPD (Media Presentation Description) defined in MPEG-DASH is employed as a manifest file. Note that not only MPD in MPEG-DASH, but also other protocols that use a playlist notation, such as Http Livestreaming and Smooth Streaming, may be employed in the present embodiment. Also, for example, in a case where video data is stored in a single file, a playlist notation may be unnecessary.

Communication System

Figure 2:
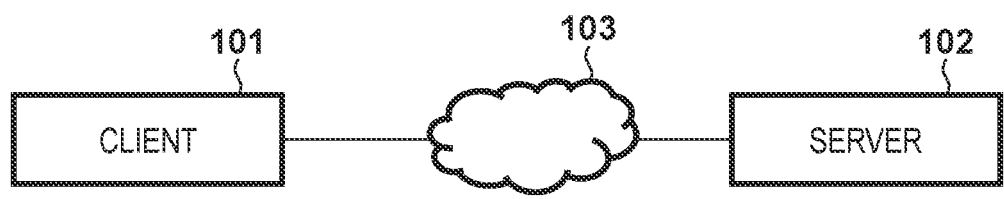
FIG. 2 is a system configuration diagram.

FIG. 2 is a diagram showing an example of a configuration of a communication system according to the present embodiment. A client 101, which is a client apparatus according to the present embodiment, is an information processing apparatus that receives an omnidirectional moving image pushed from the server 102. The client 101 is a communication apparatus that has a display function, such as a DTV (Digital TV) an HMD (Head Mount Display), a smartphone, or a tablet. The client 101 may be a web browser or another application installed in a smartphone, a tablet, or a PC. Alternatively, the client 101 may be a projector that includes a projecting apparatus. Alternatively, the client 101 may be a multi-projector that includes a plurality of projecting apparatuses. Note that the present embodiment is applicable even if the client 101 is an intermediate apparatus such as a proxy apparatus or a CDN (Contents Deliver Network).

The server 102, which is a server apparatus according to the present embodiment, is an information processing apparatus that pushes an omnidirectional moving image to the client 101. The server 102 is a digital camera, a digital video camera, a network camera, a projector, a cellular phone, a smartphone, a PC (personal computer), a server apparatus, or the like, and functions as a server apparatus that is a source of video data. In the present embodiment, the server 102 is realized using a single PC. However, the server 102 may be realized by providing decentralized servers on a cloud.

A network 103 is a communication network that is used by the client 101 and the server 102 to perform communication with each other. The client 101 and the server 102 are connected to the network 103. The present embodiment is not limited by the configuration of the network 103. For example, the network 103 is connected using a LAN (Local Area Network), a WAN (Wide Area Network), an LTE (Long Term Evolution), which is for public mobile communication, or a combination of them. LAN is an abbreviation of Local Area Network, and WAN is an abbreviation of Wide Area Network. LTE is an abbreviation of Long Term Evolution. For example, a wired LAN complying with Ethernet (registered trademark) or a wireless LAN complying with IEEE (Institute of Electrical and Electronics Engineers) 802.11 series is used as a LAN. For example, the Internet is used as a WAN. Note that the client 101 and the server 102 may be connected directly to each other without the network 103 being interposed between them. For example, a wireless ad hoc network may be used so that the client 101 and the server 102 communicate with each other.

Client

Figure 3:
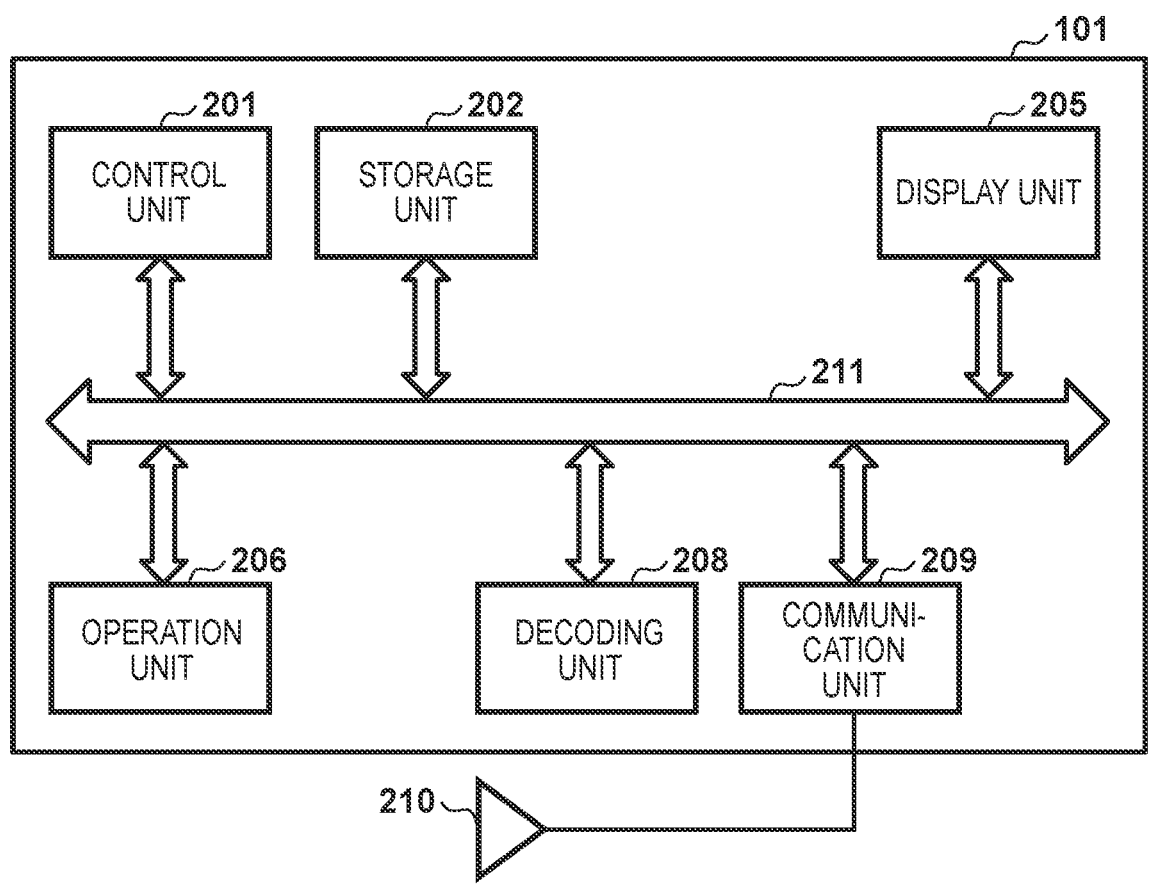
FIG. 3 is a block diagram showing an example of a hardware configuration of a client.

FIG. 3 is a block diagram showing an example of a hardware configuration of the client 101. In FIG. 3, a control unit 201 is a central processing unit (CPU) that comprehensively controls operations of the client 101, and controls constituent units (202, 205, 206, 208, and 209) via a system bus 211.

A storage unit 202 is a storage apparatus that stores and manages various kinds of data. The storage unit 202 is constituted by a storage apparatus such as a hard disk or an SSD (solid state drive), a RAM (a rewritable memory), a ROM (a read-only memory), or the like, for example.

A display unit 205 performs various kinds of display under the control of the control unit 201. The display unit 205 is constituted by a liquid crystal panel, an organic EL display, or the like, for example. An operation unit 206 accepts a user operation. The operation unit 206 is constituted by a touch panel, a keyboard, a pointing device, or the like, for example.

A decoding unit 208 performs decoding processing on video data. The present embodiment describes an example in which the decoding unit 208 is realized using a dedicated logical circuit. However, the decoding unit 208 may be realized by the control unit 201 controlling the client 101 overall based on a computer program.

A communication unit 209 controls a wireless LAN interface 210 to control various kinds of communication processing. 210 indicates a wireless LAN interface. In the present embodiment, wireless LAN communication is performed via the wireless LAN interface. However, the present invention is not limited in this way, and communication may be performed via a wired LAN interface or a public mobile communication interface. Also, the present invention is not limited to these communication methods, and communication may be performed using other wireless communication methods such as Bluetooth (registered trademark). Also, a plurality of such interfaces may be provided. In the present embodiment, the display unit 205 that displays video data is included in one piece of hardware as a constituent element of the client 101. However, an external display apparatus may be connected to the client 101 via an interface. For example, the present embodiment is also applicable if the display unit 205 is an apparatus that is provided with the display function of a display, a television, or the like that is connected to the display unit 205 via HDMI (registered trademark) or the like.

Figure 4:
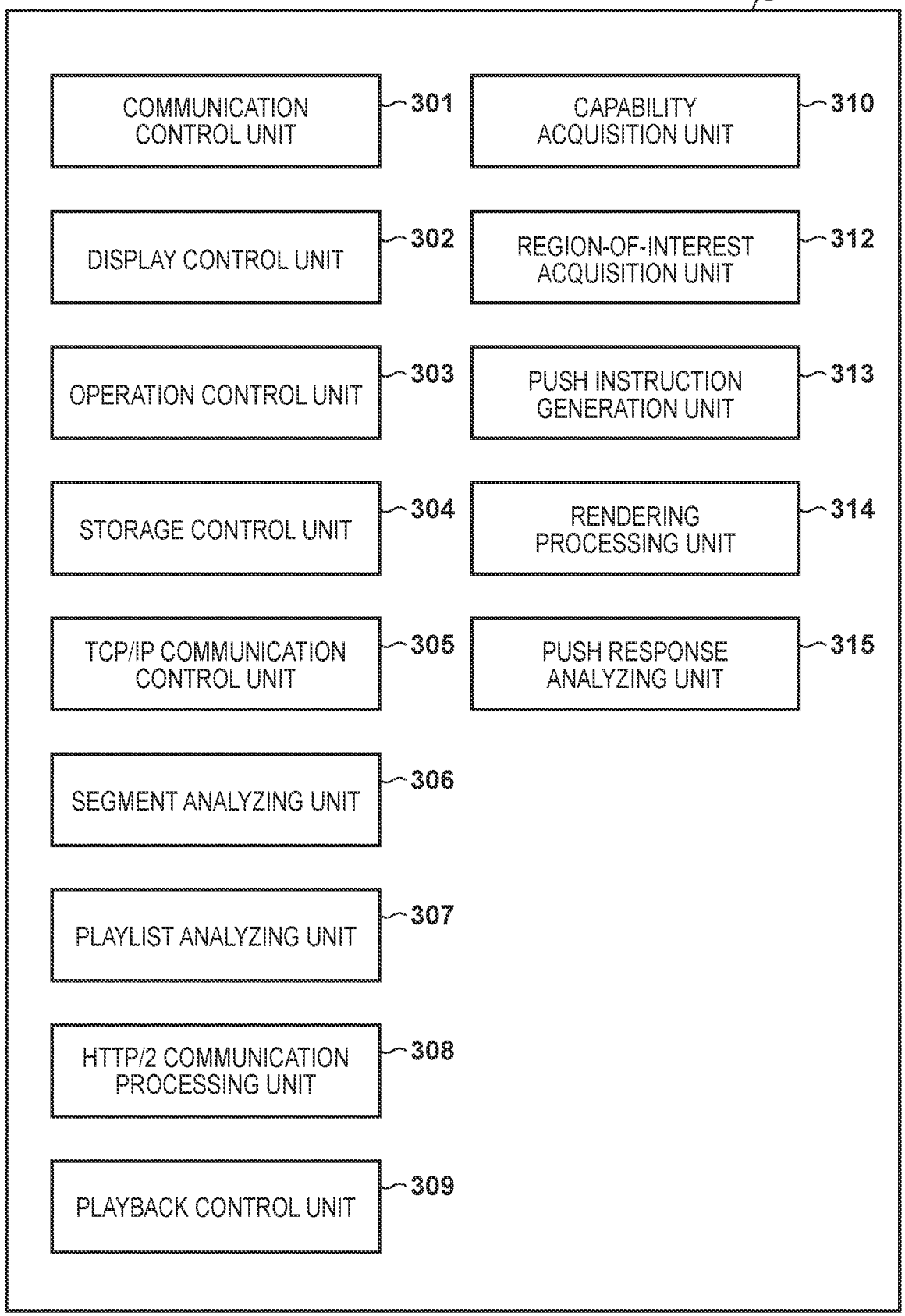
FIG. 4 is a block diagram showing an example of a functional configuration of the client.

FIG. 4 is a block diagram showing an example of a functional configuration of the client 101. Note that, in the present embodiment, the functions of the functional blocks described below are realized by a CPU (not shown) of the control unit 201 executing a software program (computer program) stored in a memory (not shown) of the storage unit 202. However, part or all of each functional block may be realized as hardware.

In FIG. 4, a communication control unit 301 controls communication, using the communication unit 209. A display control unit 302 displays, using the display unit 205, omnidirectional video data that has been subjected to rendering processing performed by a rendering processing unit 314. The display control unit 302 displays a UI (user interface) for accepting a user operation. The display unit 205 displays, to a user, a button that provides options regarding whether or not to view omnidirectional video data, a dialog, or another message. An operation control unit 303 controls the operation unit 206 to accept a user operation. A storage control unit 304 controls the storage unit 202 to store or delete data such as processed data, video data, or the like.

A TCP/IP communication control unit 305 uses the communication unit 209 to control communication with the server 102 according to the TCP/IP (Transmission Control Protocol/Internet Protocol) method. Although the present embodiment describes an example in which TCP/IP communication is employed, the protocol is not limited to TCP/IP, and UDP (User Datagram Protocol) may be employed. A segment analyzing unit 306 decodes segments, which are pieces of video data acquired from the server 102.

A playlist analyzing unit 307 analyzes a playlist written in an MPD file acquired from the server 102. An URL (Uniform Resource Locator) that is used to access a specific segment at a predetermined point in time is written in a playlist. Also, pieces of information such as an identifier indicating whether or not segments are pieces of omnidirectional video data, a projection method applied to a specific segment, the view angles of the segments, and so on may be written in the MPD file. Although information regarding segments are written in the playlist and given to the client in the present embodiment, the present invention is not limited to such a method. For example, such parameters may be acquired by analyzing a file such as an HTML file or a javascript file.

An HTTP/2 communication processing unit 308 performs communication processing for a client defined in HTTP/2 (Hyper Text Transfer Protocol version 2). The HTTP/2 communication processing unit 308 notifies the server of a push instruction. A push instruction is a well-known procedure through which a client and a server perform negotiations regarding a push behavior of the server.

Details of a push policy are written in the Accept-Push-Policy Header Field (https://tools.ietf.org/html/draft-ruellan-http-accept-push-policy-02). The client 101 transmits a header field named "accept-push-policy" to the server 102. The client sets, to the header field, a server's behavior that is preferable for the client, and transmits the header field. In response to the push policy received from the client, the server sets, to a header field named "push-policy", a server's behavior selected by the server.

In the present embodiment, the client 101 uses the header field named "accept-push-policy" as an HTTP request, which is used to request a push policy. However, the name of the header field is not limited to such a name. Also, "accept-push-policy" may include one or more push policies.

A playback control unit 309 performs decoding processing on a received segment, using the decoding unit 208. A capability acquisition unit 310 acquires information regarding the processing capabilities of the client 101. The processing capabilities of the client 101 include, for example, an omnidirectional video data projection method for which the client 101 can execute rendering processing, a view angle that allows for display on the display unit 205, information regarding display processing such as a screen size, and so on. Capability information that is acquired by the capability acquisition unit 310 is not limited to those shown above, and may include another piece of acquired information that is required to play back omnidirectional video data.

A region-of-interest acquisition unit 312 acquires a region of interest in the omnidirectional video data that is to be viewed through the client 101. The region-of-interest acquisition unit 312 may acquire a region of interest using polar coordinates, or acquire coordinates, on a two-dimensional plane, of the region after projection processing onto the two-dimensional plane has been performed. Alternatively, a region of interest recommended by the server 102 may be determined as a region of interest that is to be acquired by the client 101. A region recommended by the server 102 may be a region selected by the server or a region viewed by many users.

A push instruction generation unit 313 generates the content of a push instruction that the client 101 provides to the server 102. An example of a push instruction that is generated by the push instruction generation unit 313 to request omnidirectional video data will be described later with reference to FIG. 7.

The rendering processing unit 314 performs rendering processing on the acquired segments based on the projection method to restore the omnidirectional video data. A push response analyzing unit 315 analyzes a push response, and acquires information indicating whether or not segments pushed from the server 102 are pieces of omnidirectional video data. Also, the push response analyzing unit 315 analyzes a push response, and acquires information regarding a projection method corresponding to segments that are to be pushed from the server 102, and region information.

Server

Figure 5:
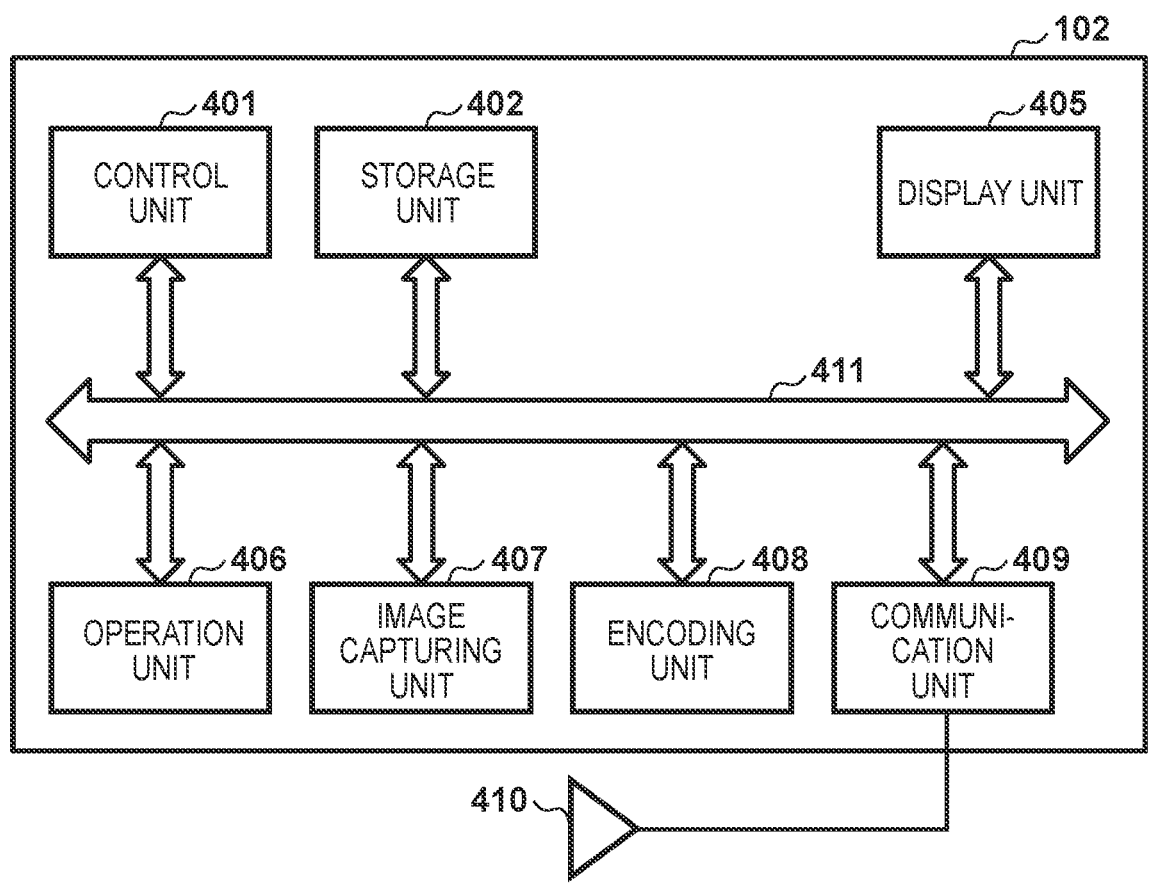
FIG. 5 is a block diagram showing an example of a hardware configuration of a server.

FIG. 5 is a block diagram showing an example of a hardware configuration of the server 102. In FIG. 5, a control unit 401 is a central processing unit (CPU) that comprehensively controls operations of the server 102, and controls constituent units (402 and 405 to 409) via a system bus 411.

A storage unit 402 is a storage apparatus that stores and manages various kinds of data. The storage unit 402 is constituted by a storage apparatus such as a hard disk or an SSD, a RAM, a ROM, or the like, for example.

A display unit 405 performs various kinds of display under the control of the control unit 401. The display unit 405 is constituted by a liquid crystal panel, an organic EL display, or the like, for example. An operation unit 406 accepts a user operation. The operation unit 406 is constituted by a touch panel, a keyboard, a pointing device, or the like, for example. An image capturing unit 407 is an image capturing apparatus that captures video data. The image capturing unit 407 is realized using a CCD (Charge Coupled Device) sensor or the like, for example.

An encoding unit 408 performs encoding processing on video data. The present embodiment describes an example in which the encoding unit 408 is realized using a dedicated logical circuit. However, the encoding unit 408 may be realized by the control unit 401 controlling the server 102 overall based on a computer program.

A communication unit 409 controls a wired LAN interface 410 to control various kinds of communication processing. 410 indicates a wired LAN interface. The present embodiment describes an example in which the communication control unit controls the wired LAN interface. However, the present invention is not limited in this way, and communication may be performed via a wireless LAN interface or a public mobile communication interface. Also, the present invention is not limited to these communication methods, and communication may be performed using other communication methods such as Bluetooth (registered trademark).

Also, although the present embodiment describes an example in which the server 102 captures video data, the server 102 may acquire omnidirectional video data from another apparatus. Also, although the present embodiment describes an example in which video data acquired by a single server apparatus is used, the present invention is not limited in this way, and the server 102 may generate video data based on pieces of video data acquired from a plurality of apparatuses. Alternatively, the server 102 may acquire video data generated based on pieces of video data acquired from a plurality of apparatuses, from another apparatus. Although the server 102 includes the encoding unit 408 in the present embodiment, the server 102 may acquire encoded data from another apparatus.

Figure 6:
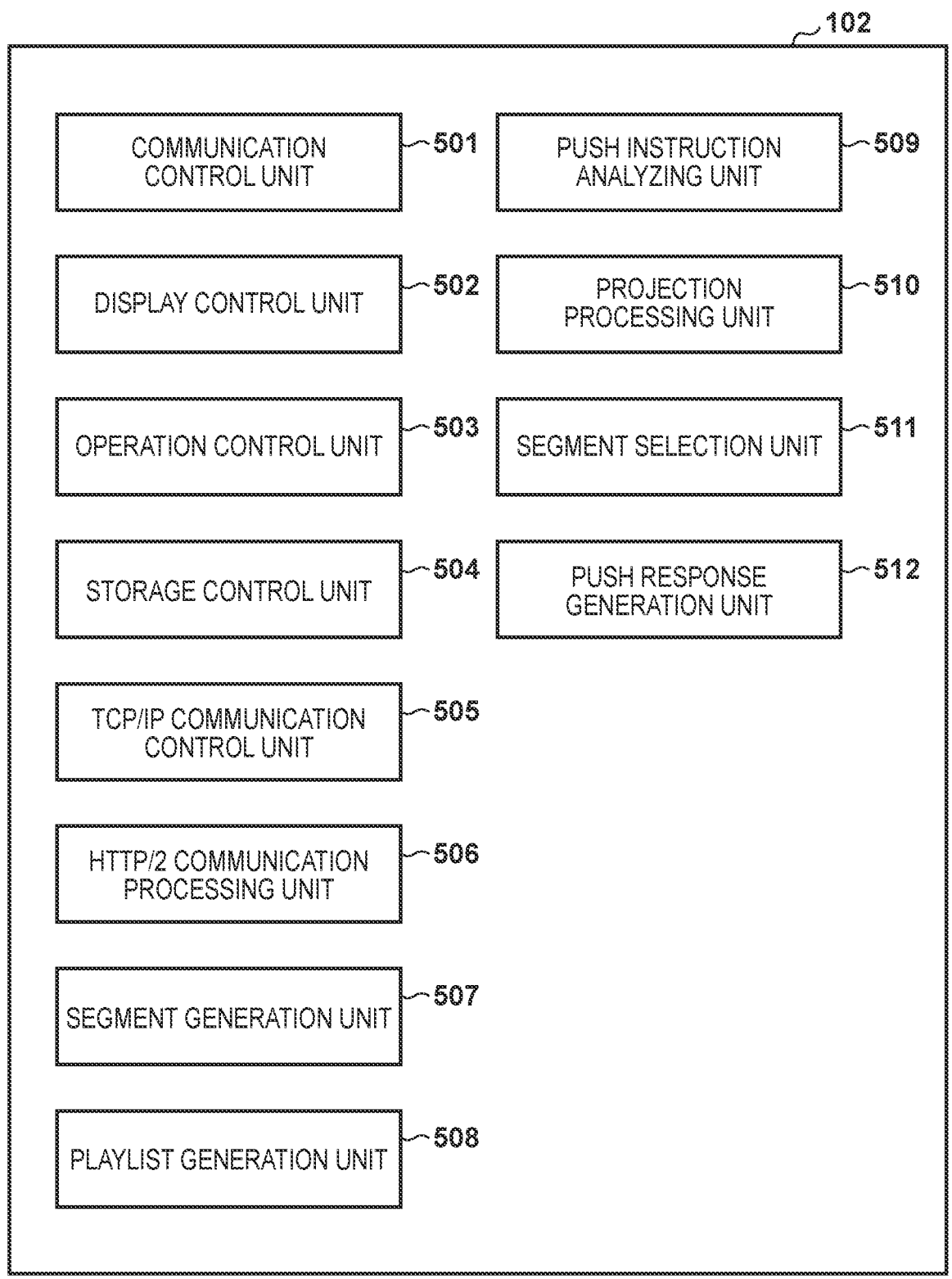
FIG. 6 is a block diagram showing an example of a functional configuration of the server.

FIG. 6 is a block diagram showing an example of a functional configuration of the server 102. In FIG. 6, a communication control unit 501 controls communication, using the communication unit 409. A display control unit 502 may display a UI for accepting a user operation, using the display unit 405. An operation control unit 503 controls the operation unit 406 to accept a user operation. A TCP/IP communication control unit 505 uses the communication unit 409 to control TCP/IP communication with the client 101. Although the present embodiment describes an example in which TCP/IP communication is employed, the present invention is not limited in this way, and UDP may be employed.

An HTTP/2 communication unit 506 performs communication processing as a server defined in HTTP/2. The HTTP/2 communication unit 506 adds a push response generated by a push response generation unit 512 to an HTTP response, and transmits the HTTP response. When transmitting a push response to the client, the HTTP/2 communication unit 506 uses a header field named "push-policy". The server 102 adds a "push-policy" header to a response to the HTTP request including an "accept-push-policy" header field received from the client 101. The server 102 writes a push response to the client 101, in the "push-policy" header field. In the present embodiment, a "push-policy" header field is used to add a push response to an HTTP response. However, the present invention is not limited in this way, and another header may be used, or a push response may be included in a response body.

A segment generation unit 507 generates segments, which are to be transmitted to the client 101, from omnidirectional video data resulting from projection processing performed by a projection processing unit 510. The segment generation unit 507 may generate segments that have a plurality of different bit rates and resolutions for video data resulting from projection processing performed on a single piece of omnidirectional video data. Also, the segment generation unit 507 may generate segments for each of a plurality of pieces of video data respectively projected using different projection processing methods. Note that segments transmitted by the server 102 may be segments generated by another apparatus.

A playlist generation unit 508 generates a playlist that is used by the client to acquire video data. An URL that is used to access a specific segment at a specific point in time is written in a playlist. Also, information indicating image capturing method employed to project a specific segment, information indicating the view angle of segments, and so on are written in a playlist. Although segment information regarding each layer is written in a playlist in the present embodiment, the present invention is not limited in this way. Such information may be written in an HTML file or a javascript file. Note that a playlist transmitted by the server 102 may be generated by another apparatus.

A push instruction analyzing unit 509 analyzes the content of a push instruction attached to a request received from the client. A push instruction received from the client includes a projection method for omnidirectional video data that can be processed by the client, the view angle of the client, a screen region of the client, and so on. Note that the push instruction analyzing unit 509 also analyzes a push instruction defined in DASH with Server Push and Websockets (23009-6) or the like.

A projection processing unit 510 performs processing to project video data captured by the image capturing unit 407, onto a two-dimensional plane. Note that the server 102 may apply a plurality of projection processing methods to omnidirectional video data to generate separate pieces of video data. Also, the server 102 may use video data that has been subjected to projection processing performed by another apparatus.

A segment selection unit 511 selects initialization segments and media segments that are to be pushed, based on a push instruction received from the client 101. Although the present embodiment describes an example in which initialization segments and media segments are selected, only initialization segments may be selected.

The push response generation unit 512 generates a response to a push instruction received from the client. The push response generation unit 512 describes information regarding segments that are to be pushed from the server 102, in response to the push instruction received from the client. A specific example of a push response will be described later with reference to FIG. 9.

Push Instruction

Figure 7:
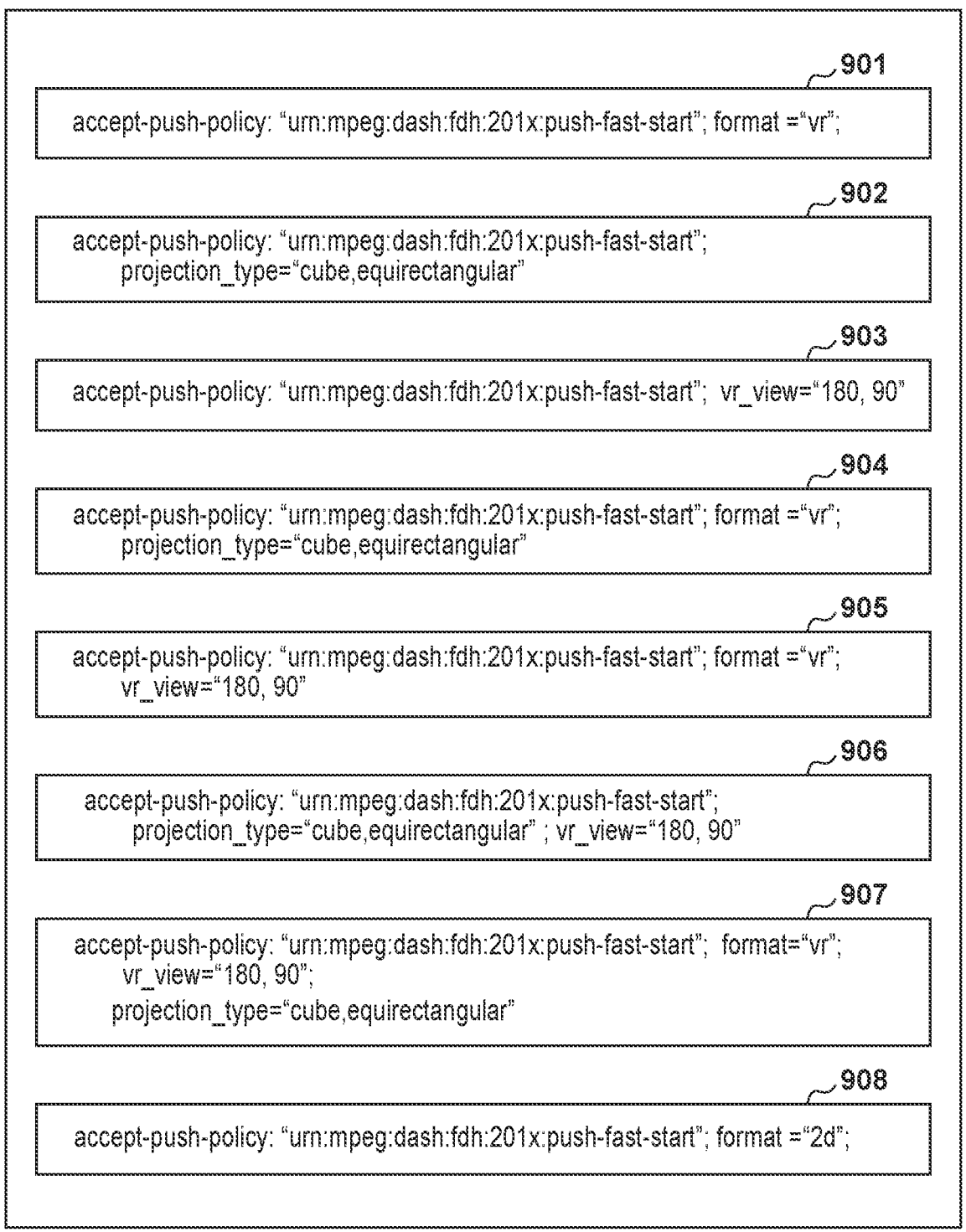
FIG. 7 shows examples of push instructions.

FIG. 7 is a diagram showing examples of push instructions generated by the client 101. Note that the push instructions shown in this embodiment are examples, and the content, the grammar, and the notation of the push instructions are not limited to those of the examples.

901 indicates an example of a push instruction that includes a push request for omnidirectional video data. Using this instruction, the client 101 can instruct the server 102 to push omnidirectional video data.

"urn:mpeg:dash:fdh:201x:push-fast-start" is an identifier indicating that this push instruction is supported by the version indicated by the MPEG-DASH scheme. This identifier indicates that a push instruction is attached to an MPD request. Note that the identifier is not necessarily denoted in this way.

"format="vr"" is a push instruction that instructs the server 102 to push omnidirectional video data. Note that a push instruction that instructs the server 102 to push omnidirectional video data is not necessarily denoted using "format" or "vr". For example, such an instruction may be specified using "media="vr"" or "format="omnidirectional"".

Note that an identifier that indicates data for the right eye, data for the left eye, or stereoscopic data may be written in a push request for omnidirectional video data. In such a case, an instruction specifying "format="vr, stereoscopic"" is a push instruction that instructs the server 102 to push stereoscopic data. A notation "format="vr, right, left"" indicates a push instruction for pushing both the data for the right eye and the data for the left eye. A push instruction for pushing omnidirectional video data may be denoted using designators, identifiers, and parameters defined in various standard specifications such as:

Omnidirectional Media Application Format (23000-20); and

DASH with Server Push and Websockets (23009-6).

902 indicates an example of a push instruction that specifies an omnidirectional video data projection method.

By specifying a projection method, the client 101 can instruct the server 102 to apply a projection method that can be processed by the client. As a result, the client 101 can increase the likelihood that the client 101 can receive segments of omnidirectional video data that the client 101 can play back, from the server 102. A plurality of kinds of projection methods may be specified, or only one projection method may be specified.

"projection_type="cube,equirectangular"" is an identifier that specifies omnidirectional video data projection methods supported by the client. This example shows that a cube projection method and an equirectangular projection method are supported by the client. Note that an identifier that specifies omnidirectional video data projection methods supported by the client is not necessarily denoted in such a way. For example, the identifier is not necessarily denoted as "projection_type", and may be denoted in another way, for example by using "projection" or "mapping".

Also, an omnidirectional video data projection method supported by the client is not necessarily denoted as the specific name of the projection method such as "cube" or "equirectangular". For example, numbers respectively corresponding to the projection methods may be defined in advance, such as "equirectangular:0", "cube:1", and "pyramid:2", and the server 102 may be notified of such a number. That is, a projection method may be specified as "projection_type="0,1"" or the like.

Although a projection method is specified in the present embodiment, a region of a projected figure may additionally be specified. For example, if projection is performed onto a rectangular parallelepiped, information indicating a face of the rectangular parallelepiped may be added. Such information is denoted as "projection_type="cube,front"", for example. In this case, the client makes a request to instruct the server to push a segment projected onto the front face of the rectangular parallelepiped. Although "front" is specified in the present embodiment, the six faces of the rectangular parallelepiped may respectively be assigned values or identifiers, and such values or identifiers may be specified. For example, if "front" is assigned "0" or "f", the region may be denoted as "projection_type="cube,0"" or "projection_type="cube,f"", for example.

Note that types of projection methods and a method for specifying a different region for each projection method may be denoted using designators, identifiers, parameters, and so on that are defined in various standard specifications such as:
Omnidirectional Media Application Format (23000-20); and
DASH with Server Push and Websockets (23009-6).

903 indicates an example of a push instruction that specifies a region of interest of omnidirectional video data. By specifying a region of interest, the client can increase the likelihood that the client can receive segments of the region of interest desired by the user. "vr_view="180,90"" is a push instruction that requests a region of interest specified by an azimuth angle of 180° and an elevation angle of 90°. Although a push instruction in which the azimuth angle and the elevation angle are arranged in this order is transmitted in the present embodiment, the angles are not necessarily arranged in this order. In this case, an azimuth angle from the origin (0°) defined by the server to 180° and an elevation angle from the origin (0°) defined by the server to 90° specify a region of interest.

Although the example indicated by 903 is given two values, i.e. an azimuth angle and an elevation angle, a region of interest is not necessarily specified in this way, and four values, namely the starting point of the azimuth angle, the ending point of the azimuth angle, the starting point of the elevation angle, and the ending point of the elevation angle, may be provided. For example, a region of interest may be denoted as "vr_view=30,180,−20,90". This notation expresses a push instruction that requests omnidirectional video data specified by an azimuth angle of 30° to 180° and an elevation angle of −20° to 90°. Note that the above notation is not the only notation that can be used to provide four values.

Also, although two values, i.e. an azimuth angle and an elevation angle, are provided in the present embodiment, the present invention is not limited in this way, and either one value, an azimuth angle or an elevation angle, may be provided. If only an azimuth angle is to be provided, an azimuth angle from the origin (0°) defined by the server may be specified using a notation "vr_view=H_FOV=180", for example, or the starting point of the azimuth angle and the ending point of the azimuth angle may be specified using a notation "vr_view=H_FOV,−30.180", for example. Note that the notations using vr_view, H_FOV, and so on are not limited in this way. If only an elevation angle is to be provided, an elevation angle from the origin (0°) defined by the server may be specified using a notation "vr_view=V_FOV=90", for example, or the starting point of the elevation angle and the ending point of the azimuth angle may be specified using a notation "vr_view=V_FOV.−20, 90", for example. Note that the notations using vr_view, V_FOV, and so on are not limited in this way.

Also, although a region of interest is specified using a combination of an azimuth angle and an azimuth angle in the present embodiment, a region of interest is not necessarily specified in this way, and may be specified by selecting one or more parameters from angles of rotation about X, Y, and Z rotational axes (yaw, pitch, and roll). For example, a region of interest may be specified by "vr_view=yaw=90, pitch=90, roll=90". Alternatively, a region of interest may be specified using the relative coordinates of pixels in a screen. For example, a notation "vr_view=0,0,640,480" may be used. In this case, a push instruction is made to request a segment that includes a region of 640×480 pixels starting from the top-left coordinate point when omnidirectional video data is projected onto a two-dimensional plane, for example.

Also, a region of interest may be denoted using designators, identifiers, parameters, and so on that are defined in various standard specifications such as:
Omnidirectional Media Application Format (23000-20); and
DASH with Server Push and Websockets (23009-6), and that specify a region of omnidirectional video data, Also, although the client 101 specifies an azimuth angle and an elevation angle in the present embodiment, the client may issue a push instruction so that the client 101 can acquire a region recommended by the server. For example, a notation "vr_view-optimalViewPoint" may be used. As a result, it is possible to instruct the server to transmit a region of interest that is desired by the server to be viewed by the client. Note that a plurality of regions of interest may be specified.

904 indicates an example of a combination of a push request for omnidirectional video data and a push instruction that specifies an omnidirectional video data projection method. In 904, a push request for omnidirectional video data is made by "format="vr"", and a projection method is specified by "projection_type="cube,equirectangular"".

905 indicates an example of a combination of a push instruction that requests omnidirectional video data and a push instruction that specifies a region of interest of omnidirectional video data. In 905, a push request for omnidirectional video data is made by "format="vr"", and a region of interest defined by an azimuth angle of 180° and an elevation angle of 90° is specified by "vr_view="180,90"".

906 indicates an example including a push instruction that specifies an omnidirectional video data projection method and a push instruction that specifies a region of interest of omnidirectional video data. In 906, a projection method is specified by "projection_type="cube,equirectangular"", and a region of interest defined by an azimuth angle of 180° and an elevation angle of 90° is specified by "vr_view="180, 90""

Note that a region of interest of omnidirectional video data may be specified for each projection method. For example, a notation "projection_type="cube,equirectangular"; vr_view="cube,front, equirectangular,360,180"" may be used. In this case, regarding segments projected onto a rectangular parallelepiped, an instruction is made so that segments on the front face are to be pushed, and so that segments projected through the equirectangular projection method include the entire region specified by an azimuth angle of 360° and an elevation angle of 180.

Also, a region of interest may be specified for a certain projection method, and may not be specified for another projection method. For example, a notation "projection_type="cube,equirectangular"; vr_view="cube, front, equirectangular"" may be used. In this case, regarding segments projected onto a rectangular parallelepiped, the client 101 is notified of the fact that segments on the front face are to be pushed, and the fact that a segment that includes the entire region defined by a segment angle of 180, projected through the equirectangular projection method, is to be pushed.

907 indicates an example of a combination of a push instruction that includes a push request for omnidirectional video data projection method, a push instruction that specifies an omnidirectional video data projection method, and a push instruction that specifies a region of interest of omnidirectional video data.

As indicated by 904 to 907, it is possible to further increase the likelihood that the client can receive segments of omnidirectional video data that are suitable for the client, by combining a plurality of push instructions.

908 indicates an example of a push instruction that requests the server 102 not to push omnidirectional video data and to transmit two-dimensional omnidirectional video data segments. Thus, it is possible to explicitly notify the server 102 of the fact that the client does not support playback of omnidirectional video data. "format="2d"" is a push instruction that requests the server 102 not to push omnidirectional video data and to transmit two-dimensional video data segments. Note that the above notation is not the only notation for requesting the server 102 not to push omnidirectional video data and to push two-dimensional video data.

A push instruction that makes a request to transmit two-dimensional video data segments may be denoted using designators, identifiers, and parameters that are defined in various standard specifications such as:

Omnidirectional Media Application Format (23000-20); and

DASH with Server Push and Websockets (23009-6).

Note that, if omnidirectional video data is generated by stitching a plurality of moving images together, a two-dimensional video data segment may be any one of pieces of moving data that have not been stitched together. MPD File FIG. 8 is a diagram showing an example of an MPD file that the server 102 transmits to the client 101. Based on the URL of a segment and the content of an MPD file that have been received from the server 102, the client 101 determines whether or not the received segment is omnidirectional video data. The client 101 also determine the projection method and the region of interest based on the URL of the segment and the content of the MPD file that have been received from the server 102.

1101 indicates an example of an MPD file showing that the segment is omnidirectional video data. In 1102, SupplementalProperty is given "SchemeIdUri", and thus the client 101 can understand that the segment specified in AdaptationSet is omnidirectional video data.

1103 indicates another example of an MPD file. This example shows that a segment included in a given AdaptationSet has been processed using the Cube projection method, and includes video data within a range defined by an azimuth angle of 180° and an elevation angle of 120° (1104).

The notations in an MPD file introduced here are examples, and notations in an MPD file are not limited to these examples.

Based on the URL of a segment and an MPD file that have been pushed, the client 101 determines a projection processing method for the pushed segment, a projection method with which the segment has been processed.

Push Response

Figure 9:
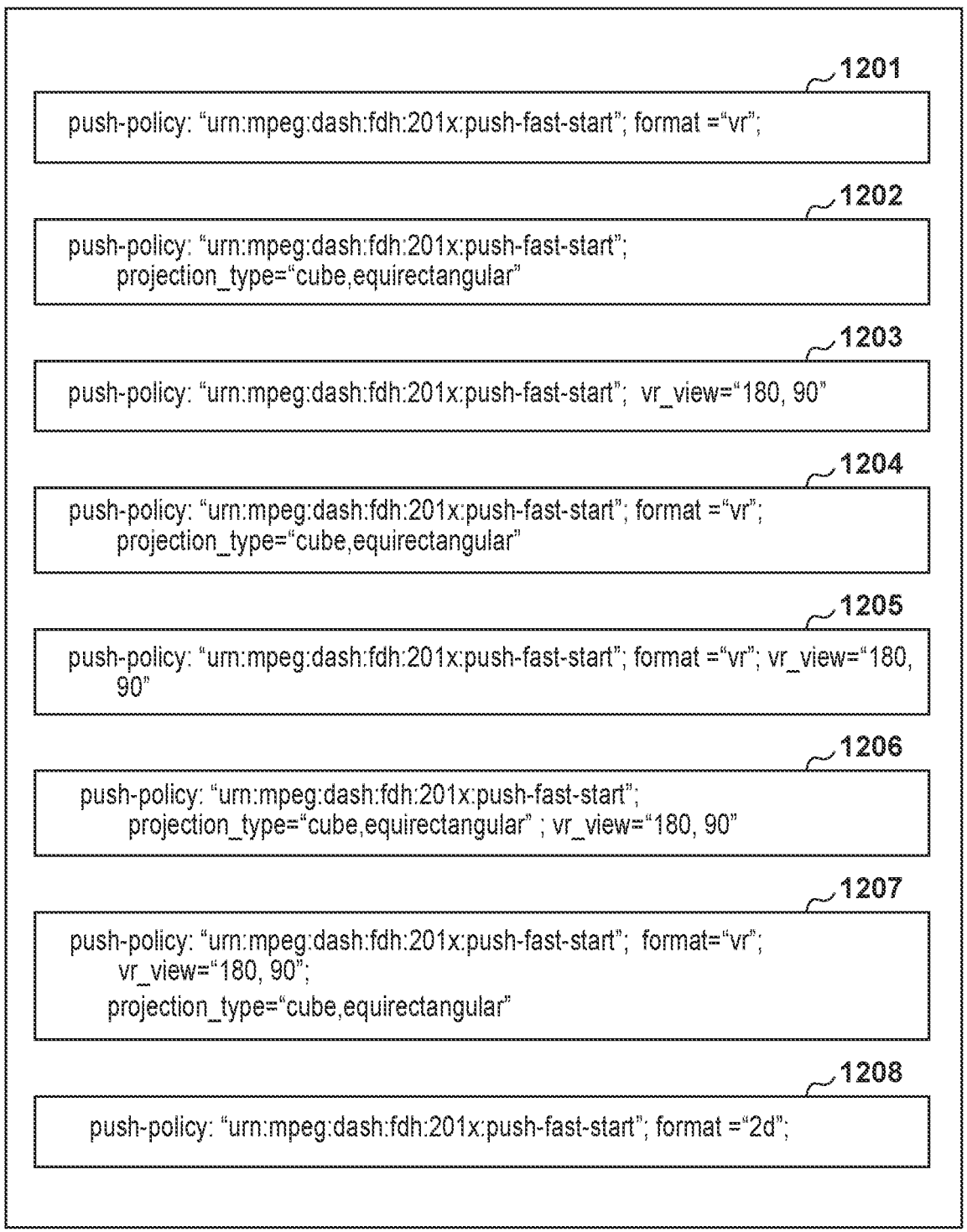
FIG. 9 is an example of a push response.

FIG. 9 shows examples of push responses generated by the server 102. Note that the push responses shown in this embodiment are examples, and the content, the grammar, and the notation of the push responses are not limited to those of the examples.

1201 indicates an example of a push response that notifies the client 101 of the transmission of omnidirectional video data. With this push response, it is possible to notify the client 101 of the fact that a segment that is to be pushed to the client 101 is omnidirectional video data.

"urn:mpeg:dash:fdh:201x:push-fast-start" is an identifier indicating that this push response is supported by the version indicated by the relevant MPEG-DASH scheme. This identifier indicates that an MPD response that is assigned this identifier is assigned a push response.

"format="vr"" is a push response that notifies the client 101 of the fact that omnidirectional video data is to be pushed. Note that a push response that notifies the client 101 of the push transmission of omnidirectional video data is not necessarily denoted using the above notation.

Note that an identifier that indicates data for the right eye, data for the left eye, or stereoscopic data may be written in a push response for omnidirectional video data. In such a case, a response specifying "format="vr, stereoscopic"" is a push response for pushing stereoscopic data. A notation "format="vr, right, left"" indicates a push response for pushing both the data for the right eye and the data for the left eye.

A push response for pushing omnidirectional video data may be denoted using designators, identifiers, and parameters that are defined in various standard specifications such as:

Omnidirectional Media Application Format (23000-20); and

DASH with Server Push and Websockets (23009-6).

Upon receiving a push instruction such as that indicated by 1201, the server 102 may push a plurality of segments generated using one projection method, or a plurality of segments generated using a plurality of projection methods.

Also, the server 102 may push a segment that includes a specific region of interest, or select and push a combination of segments that includes the entire region of omnidirectional video data.

1202 indicates an example of a push response that notifies the client 101 of an omnidirectional video data projection method. By being notified of the projection method, the client can discern the projection method corresponding to the segments that are pushed, without analyzing the MPD. As a result it is possible to shorten the time required before playing back video data.

"projection_type="cube,equirectangular"" is an identifier indicating an omnidirectional video data projection method corresponding to segments pushed from the server 102. This example shows that segments generated using the cube projection method and the equirectangular projection method are to be pushed. Note that an identifier that specifies a projection method for omnidirectional video data that is pushed from the server 102 is not necessarily denoted in such a way.

Also, a projection method for omnidirectional video data that is to be pushed from the server 102 is not necessarily denoted as the specific name of the projection method such as "cube" or "equirectangular". For example, numbers respectively corresponding to the projection methods may be defined in advance, such as "equirectangular:0", "cube: 1", and "pyramid:2", and the server 102 may be notified of such a number. That is, a projection method may be specified as "projection_type="0,1"" or the like.

Although a projection method is specified in the present embodiment, a region of a projected figure may additionally be specified. For example, if projection is performed onto a rectangular parallelepiped, information indicating a face of the rectangular parallelepiped may be added. Such information is denoted as "projection_type="cube,front"", for example. In this case, this information means that a segment projected onto the front face of the rectangular parallelepiped is to be pushed. Although "front" is specified in the present embodiment, the six faces of the rectangular parallelepiped may respectively be assigned values or identifiers, and such values or identifiers may be specified. For example, if "front" is assigned 0 or "f", the region may be denoted as "projection_type="cube,0"" or "projection_type="cube,f"", for example.

Note that types of projection methods and a method for discerning a different region for each projection method may be denoted using identifiers, parameters, and so on that are defined in various standard specifications such as:

Omnidirectional Media Application Format (23000-20); and

DASH with Server Push and Websockets (23009-6), and that indicate omnidirectional video data projection methods and regions.

Upon receiving a push instruction such as that indicated by 1202, the server 102 may push a segment that includes a specific region of interest, or select and push a combination of segments that includes the entire region of omnidirectional video data.

1203 indicates an example of a push response that indicates a region, which is to be pushed, of omnidirectional video data. "vr_view="=180,90"" is a push response that pushes a region of interest specified by an azimuth angle of 180° and an elevation angle of 90°. Although a push instruction in which the azimuth angle and the elevation angle are arranged in this order is transmitted in the present embodiment, the angles are not necessarily arranged in this order. In this case, an azimuth angle from the origin (0°) defined by the server 102 to 180° and an elevation angle from the origin (0°) defined by the server 102 to 90° specify a region of interest.

Although two values, i.e. an azimuth angle and an elevation angle, are provided in the present embodiment, a region of interest is not necessarily specified in this way, and four values, namely the starting point of the azimuth angle, the ending point of the azimuth angle, the starting point of the elevation angle, and the ending point of the elevation angle, may be provided to specify a region of interest. For example, a region of interest may be denoted as "vr_view=30,180,-20,90". This notation expresses a push response that pushes omnidirectional video data specified by an azimuth angle of 30° to 180° and an elevation angle of −20° to 90°. Note that such a notation is not the only notation that can be used to provide four values.

Also, although two values, i.e. an azimuth angle and an elevation angle, are provided in the present embodiment, the present invention is not limited in such a way, and either one value, an azimuth angle or an elevation angle, may be provided. If only an azimuth angle is to be provided, an azimuth angle from the origin (0°) defined by the server may be specified using a notation "vr_view=H_FOV=180", for example. Alternatively, the starting point of the azimuth angle and the ending point of the azimuth angle may be specified using a notation "vr_view=H_FOV,-30,180", for example. Note that the notations using vr_view, H_FOV, and so on are not limited in this way. If only an elevation angle is to be provided, an elevation angle from the origin (0°) defined by the server may be specified using a notation "vr_view=V_FOV=90", for example. Alternatively, the starting point of the elevation angle and the ending point of the azimuth angle may be specified using a notation "vr_view=V_FOV,-20,90", for example. Note that the notations using vr_view, V_FOV, and so on are not limited in this way.

Also, although a region of interest is specified using a combination of an azimuth angle and an azimuth angle in the present embodiment, a region of interest is not necessarily specified in this way, and may be specified by selecting one or more parameters from X, Y, and X rotational axes (yaw, pitch, and roll). For example, a region of interest may be specified by "vr_view=yaw=90, pitch=90, roll=90".

Alternatively, a region of interest may be specified using the relative coordinates of pixels in a screen. For example, a notation "vr_view=0,0,640,480" may be used. In this case, a push instruction is made to request a segment that includes a region of 640×480 pixels starting from the top-left coordinate point when omnidirectional video data is projected onto a two-dimensional plane, for example.

Also, a region of interest may be specified using parameters that are defined in various standard specifications such as:

Omnidirectional Media Application Format (23000-20); and

DASH with Server Push and Websockets (23009-6), and that specify a region of omnidirectional video data.

Upon receiving a push instruction such as that indicated by 1203, the server 102 may push segments generated using one projection method, or a plurality of segments generated using a plurality of projection methods.

1204 indicates an example of a combination of a push response that pushes omnidirectional video data and a push response that notifies the client 101 of the projection method for the omnidirectional video data.

1205 indicates an example of a combination of a push response that pushes omnidirectional video data and a push response that specifies a region of interest of the omnidirectional video data.

1206 indicates an example of a combination of a push response that notifies the client 101 of the projection method for omnidirectional video data that is to be pushed and a push response that notifies the client 101 of the region of interest of the omnidirectional video data that is to be pushed.

Note that a region of interest of omnidirectional video data may be specified for each projection method. For example, a notation "projection_type="cube,equirectangular"; vr_view="cube,front, equirectangular,360,180"" may be used. In this case, regarding segments projected onto a rectangular parallelepiped, the client 101 is notified of the fact that segments on the front face are to be pushed, and the fact that a segment that includes the entire region defined by an azimuth angle of 360° and an elevation angle of 180, projected through the equirectangular projection method, is to be pushed.

Also, a region of interest may be specified for a certain projection method, and may not be specified for another projection method. For example, a notation "projection_type="cube,equirectangular"; vr_view="cube, front, equirectangular"" may be used. In this case, regarding segments projected onto a rectangular parallelepiped, the client 101 is notified of the fact that segments on the front face are to be pushed, and the fact that a segment that includes the entire region defined by a segment angle of 180, projected through the equirectangular projection method, is to be pushed.

1207 indicates an example of a combination of a push response that notifies the client 101 of the fact that omnidirectional video data is to be pushed, a push response that notifies the client 101 of the projection method for the omnidirectional video data that is to be pushed, and a push response that notifies the client 101 of the region of interest of the omnidirectional video data that is to be pushed. Although the present embodiment describes an example in which "urn:mpeg:dash:fdh:201x:push-fast-start" is transmitted as a push response, the present invention is not limited in this way, and other pieces of information may be transmitted as a push response. For example, a list of the URLs of segments that are to be pushed, or an URL template, which is a template for a plurality of segments that are to be pushed, may be included in a push response.

1208 indicates an example of a push response that notifies the client 101 of the fact that omnidirectional video data is not to be pushed, and the two-dimensional video data segments are to be pushed. Thus, it is possible to explicitly notify the client 101 of the fact that playback of omnidirectional video data is not supported.

"format="2d"" indicates that the push response notifies the client 101 of the fact that omnidirectional video data is not to be pushed, and two-dimensional video data segments are to be pushed. Note that the above notation is not the only notation for notifying the client 101 of the fact that omnidirectional video data is not to be pushed and two-dimensional video data is to be pushed.

A push instruction that makes a request to transmit two-dimensional video data segments may be denoted using designators, identifiers, and parameters that are defined in various standard specifications such as:

Omnidirectional Media Application Format (23000-20); and
DASH with Server Push and Websockets (23009-6).

Operations of Client

Figure 10A:
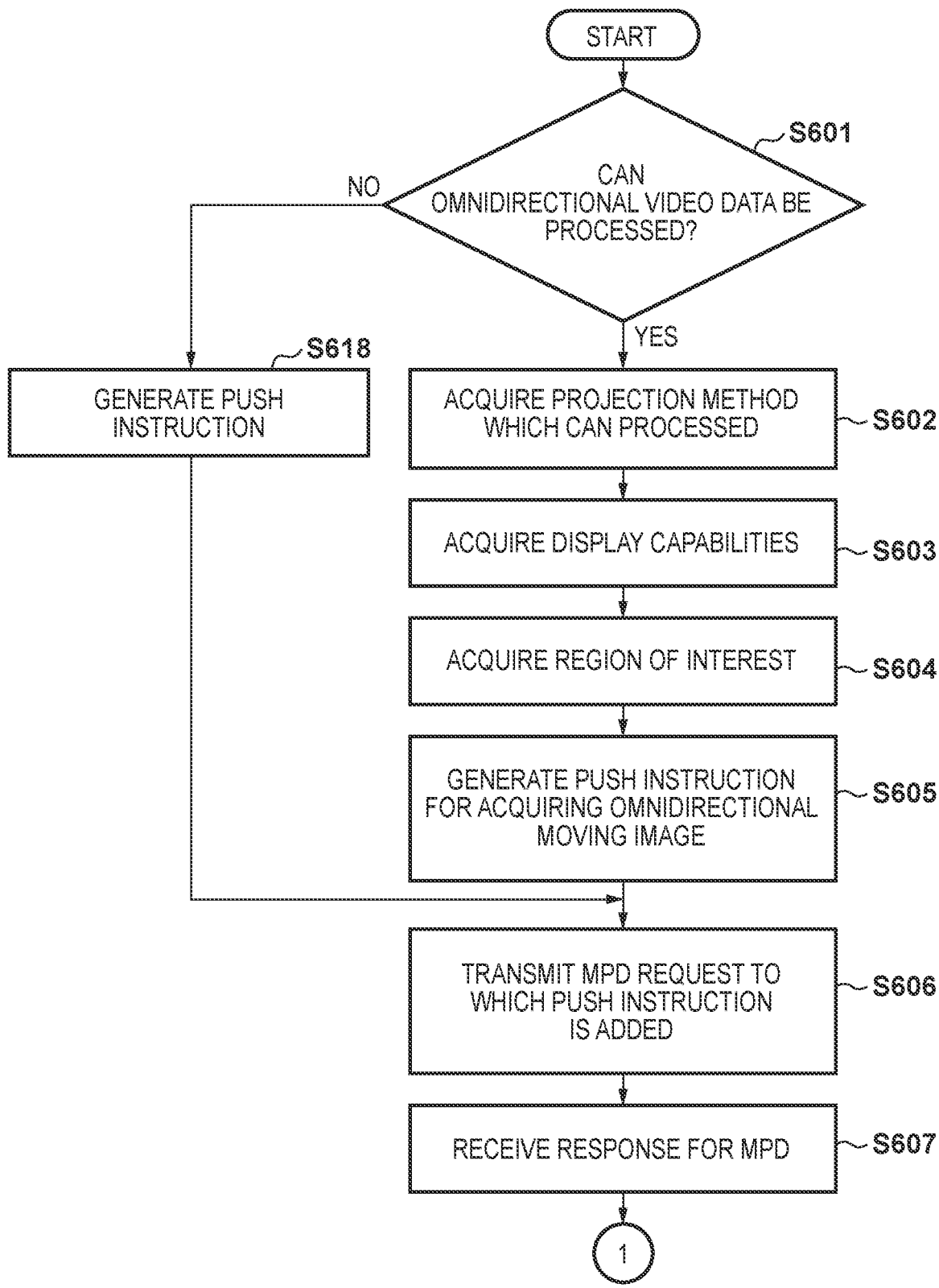
FIGS. 10A and 10B are flowcharts showing operations of the client.
Figure 10B:
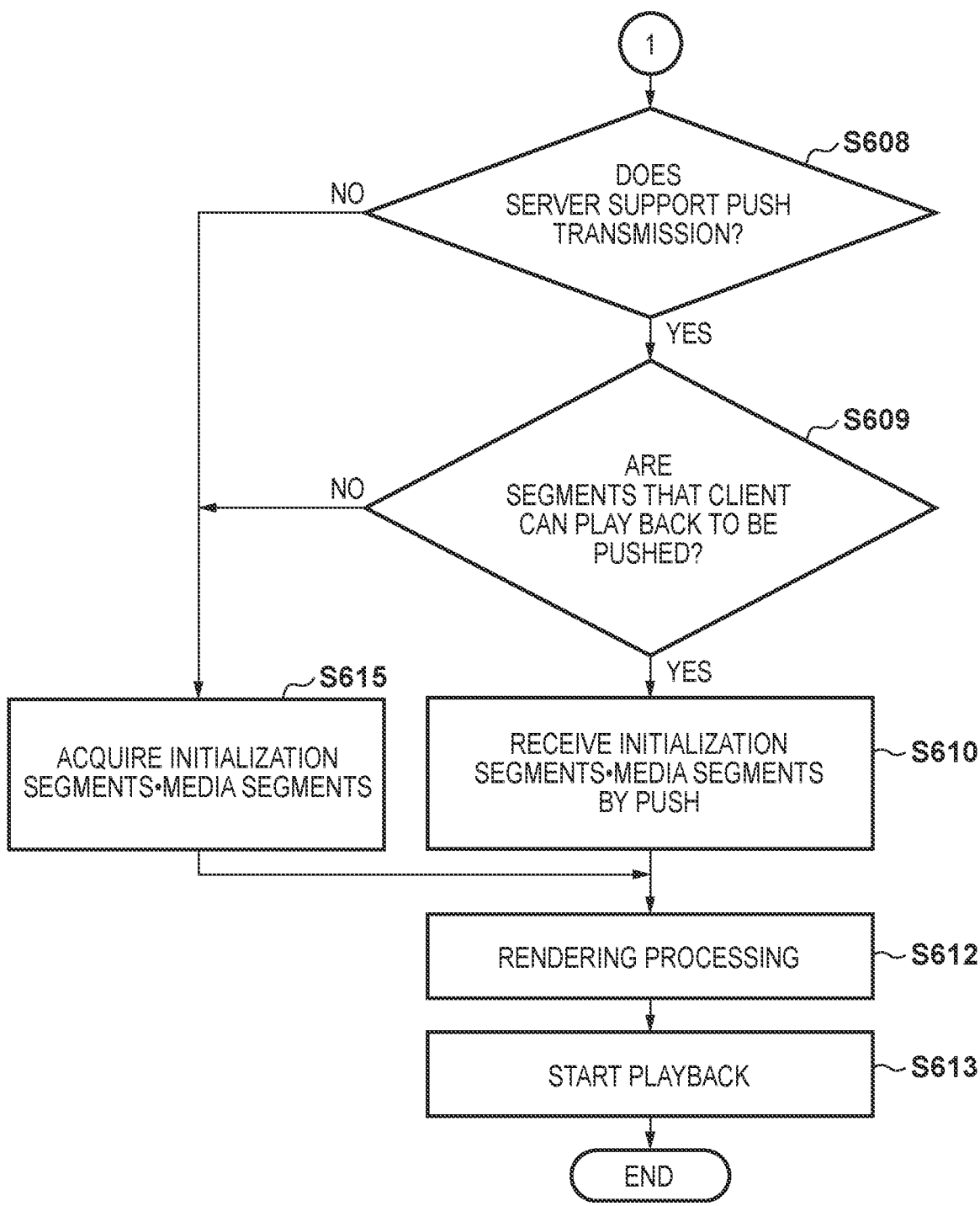

Next, operations of the client 101 and the server 102 according to the present embodiment with the above-described configurations will be described. First, operations of the client 101 will be described in detail with reference to FIGS. 10A and 10B. FIGS. 10A and 10B are flowcharts showing operational procedures that are performed by the client 101. Each step in FIGS. 10A and 10B is executed by the control unit 201 of the client 101 controlling the entire apparatus according to a computer program.

The capability acquisition unit 310 of the client 101 determines whether or not the client 101 can play back omnidirectional video data (S601). The client 101 may determine whether or not the client 101 can render omnidirectional video data, or determine whether or not it is necessary to play back omnidirectional video data in response to a user operation. If the client 101 can play back omnidirectional video data (YES in S601), the client 101 proceeds to S602, and if the client 101 cannot play back omnidirectional video data (NO in S601), the client 101 proceeds to S618.

In S602, the capability acquisition unit 310 of the client 101 acquires an omnidirectional video data projection method that can be handled by the client 101. Here, the capability acquisition unit 310 may select at least one or all of a plurality of projection methods that can be handled by the client. As described below, in S606, the client 101 notifies the server 102 of the selected projection methods. If a plurality of projection methods are selected and the server 102 is notified of them, it is more likely that the server 102 can push segments that are generated through a projection method that can be handled by the client.

Next, the capability acquisition unit 310 of the client 101 acquires information regarding the display capabilities of the client 101 (S603). Display capabilities that are to be acquired by the capability acquisition unit 310 include, but not limited to, a view angle with which the client 101 can display data on the display unit 205, and the resolution of the screen of the client 101, for example.

Next, the region-of-interest acquisition unit 312 of the client 101 acquires a region of interest for the client 101 (S604).

Next, the push instruction generation unit 313 of the client 101 generates a push instruction that is used to acquire omnidirectional video data (S605). The content of the push instruction is as described above with reference to FIG. 7. The push instruction is generated using some or all of the pieces of information acquired in S602, S603, and S604. If some of the pieces of information acquired in S602, S603, and S604 are to be used, a step in which a piece of information that is not to be used can be omitted. For example, if the server 102 is to be only informed of an omnidirectional video data projection method that can be processed, S603 and S604 can be omitted. Also, the push instruction generated by the push instruction generation unit 313 may be a push instruction that requests omnidirectional video data. If this is the case, the processing in S602 to S604 can be omitted.

Although the push instruction generated by the push instruction generation unit 313 in the present embodiment includes pieces of information that are related to the acquisition of omnidirectional video data, information is not limited to them. For example, a push instruction may be generated by combining a plurality of push instructions such as a push instruction that specifies video data/audio data, a push instruction that specifies a desirable bit rate, and so on.

Next, the HTTP/2 communication processing unit 308 of the client 101 transmits an MPD request to which the push instruction generated by the push instruction generation unit 313 is attached (S606).

Next, the HTTP/2 communication processing unit 308 of the client 101 receives an MPD response (S607).

Next, the HTTP/2 communication processing unit 308 of the client 101 determines whether or not the server 102 supports push transmission (S608). If the MPD response from the server includes a "push-policy" header field, the HTTP/2 communication processing unit 308 determines that the server 102 supports push transmission. If the push response received from the server 102 includes "push-none" or content that indicates that the server 102 does not support push transmission, the push response analyzing unit 315 determines that the server 102 does not support push transmission. Also, if a "push-policy" header is not included in the MPD response from the server, the HTTP/2 communication processing unit 308 determines that the server does not support push transmission. If the server 102 supports push transmission (YES in S608), the client 101 proceeds to S609, and otherwise (NO in S608) the client 101 proceeds to S615.

In S609, the push response analyzing unit 315 of the client 101 analyzes the push response from the server 102, and determines whether or not segments that can be played back by the client 101 are to be pushed (S609). If the client 101 can perform rendering processing corresponding to the projection method corresponding to segments that are to be pushed from the server 102, the push response analyzing unit 315 determines that the client 101 can play back the segments. For example, in a case where the client can handle the Cube projection method, if the push response from the server includes Cube, the push response analyzing unit 315 determines that segments that can played back are to be pushed. Note that, even if the push response does not include a projection method, the push response analyzing unit 315 may determine the projection method corresponding to segments that are to be pushed, based on the projection method written in the MPD file, and determine whether or not the segments can be played back. If segments that can be played back are to be pushed (YES in S609), the client 101 proceeds to S610, and otherwise (NO in S609) the client 101 proceeds to S615.

In S610, the HTTP/2 communication processing unit 308 of the client 101 receives initialization segments and media segments pushed from the server 102.

Next, the rendering processing unit 314 of the client 101 performs rendering processing on the received segment file (S612). Here, the rendering processing unit 314 determines the omnidirectional video data projection method based on the URL of the segments that have been pushed and received and the projection processing method for the segments written in the MPD file, and performs rendering processing based on the method.

Next, the playback control unit 309 of the client 101 displays omnidirectional video data on the display unit 205 using the display control unit 302 (S613). Then, the client 101 ends processing.

If the result of determination in S608 is NO or that in S609 is NO, the client starts acquiring initialization segments and media segments that the client 101 can play back, in S615. Then, the client 101 proceeds to S612.

On the other hand, if the result of determination in S601 is NO, the push instruction generation unit 313 of the client 101 does not push omnidirectional video data in S618, and generates a push instruction that requests pushing of two-dimensional video data. Then, the client 101 proceeds to S606. Processing that is performed to transit to S606 is as described above.

As described above, the client 101 is an information processing apparatus that receives, from the server 102, image data for which there are a plurality of methods for projecting omnidirectional moving image or the like. The client 101 generates a push instruction that is an instruction to push image data, transmits the push instruction to the server 102, and receives segments related to image data pushed from the server 102 in response to the push instruction. Here, the client 101 generates a push instruction that includes information regarding a projection method that can be handled by the client 101. Therefore, the server 102 can divide image data that has been developed on a two-dimensional plane using a projection method that can be handled by the client 101, into segments, and transmits the segments to the client 101, and the client 101 can receive and play back the segments.

If the client 101 cannot play back an omnidirectional image, the client 101 generates a push instruction that is an instruction to push segments related to image data of a two-dimensional image (S618), and transmits the push instruction to the server 102. Therefore, the client 101 can receive and play back image data that the client 101 can play back according to the capabilities of the client 101.

Also, the client 101 generates a push instruction that includes information indicating regions of interest in image data, and transmits the push instruction to the server 102. Therefore, the client 101 can receive and play back segments related to the regions of interest pushed from the server 102.

Operations of Server

Figure 11B:
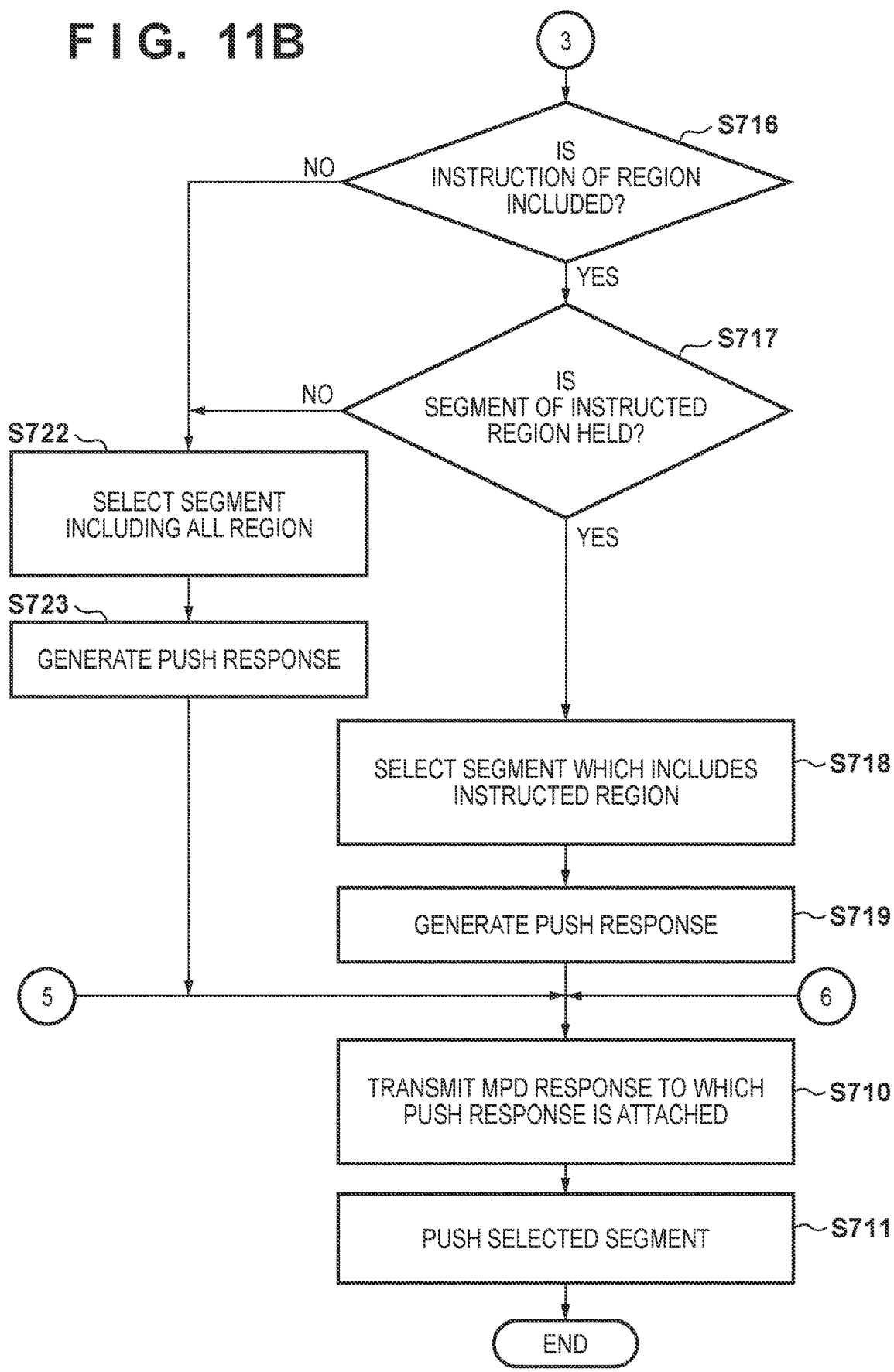
Figure 11C:
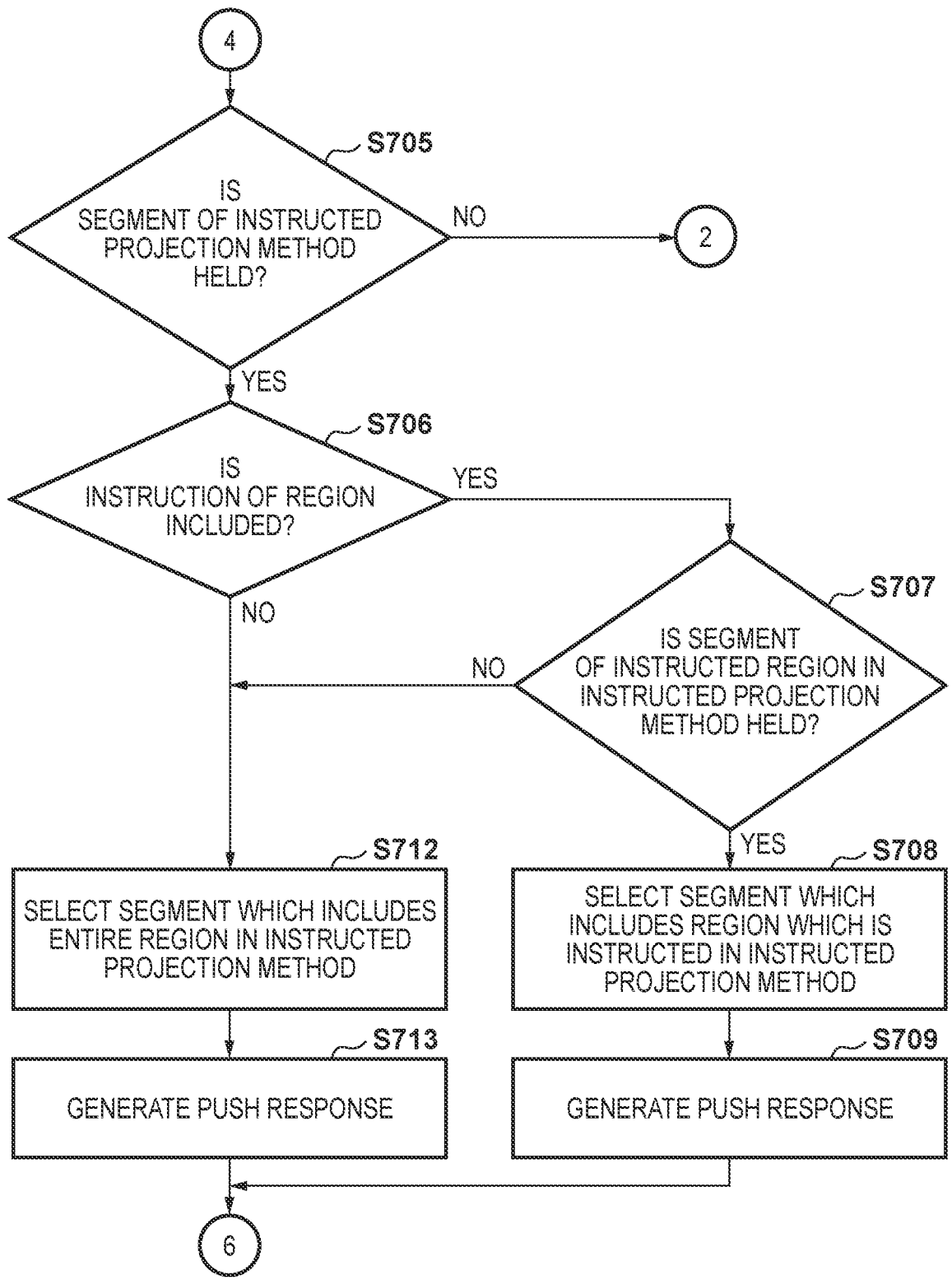

Next, the following describes operations of the server 102 in detail with reference to FIGS. 11A to 11C. FIGS. 11A to 11C are flowcharts showing operational procedures that are performed by the server 102. Each step in FIGS. 11A to 11C is executed by the control unit 401 of the server 102 controlling the entire apparatus according to a computer program.

The HTTP/2 communication unit 506 of the server 102 receives an MPD request from the client 101 (S701).

The push instruction analyzing unit 509 of the server 102 determines whether or not a push instruction is attached to the MPD request (S702). If an "Accept-Push-Policy" header field is included in the MPD request, the push instruction analyzing unit 509 determines that one or more push instructions are attached. If an "Accept-Push-Policy" header field is not included in the MPD request, the push instruction analyzing unit 509 determines that no push instructions are attached. If a push instruction is attached (YES in S702), the server 102 proceeds to S703, and if not, the server 102 proceeds to S730.

In S703, the push instruction analyzing unit 509 of the server 102 determines whether or not the push instructions include a push instruction regarding omnidirectional video data. The push instruction analyzing unit 509 determines that there is a push instruction regarding omnidirectional video data if the push instructions include:

- a push instruction that requests omnidirectional video data;
- a push instruction that specifies an omnidirectional video data projection method; and/or
- a push instruction that specifies a region of interest in omnidirectional video data.

If there is a push instruction regarding omnidirectional video data (YES in S703), the server 102 proceeds to S704, and if there is no push instruction regarding omnidirectional video data (NO in S703), the server 102 proceeds to S726.

In S704, the push instruction analyzing unit 509 of the server 102 determines whether or not the push instructions include a push instruction that specifies an omnidirectional video data projection method. If such a push instruction is included (YES in S704), the server 102 proceeds to S705, and if not (NO in S704), the server 102 proceeds to S716.

In S705, the segment selection unit 511 of the server 102 determines whether or not a segment generated according to a projection method specified by the push instruction is held. Note that the segment selection unit may determine that the result is "YES" in S705 if the segment selection unit supports at least one of the projection methods specified by the client. If a segment generated according to the specified projection method is held (YES in S705), the server 102 proceeds to S706, and if not (NO in S705), the server 102 proceeds to S726.

In S706, the push instruction analyzing unit 509 of the server 102 determines whether or not the push instructions include a push instruction that specifies a region of interest in omnidirectional video data. If the push instructions include a push instruction that specifies a region of interest (YES in S706), the server 102 proceeds to S707, and if not (NO in S706), the server 102 proceeds to S712.

In S707, the segment selection unit 511 of the server 102 determines whether or not a segment that covers the specified region according to the specified projection method is held. If such a segment is held (YES in S707), the server 102 proceeds to S708, and if not (NO in S707), the server 102 proceeds to S712.

In S708, the segment selection unit 511 of the server 102 selects a segment that covers the specified region of interest according to the specified projection method. Then, the push response generation unit 512 of the server 102 generates a push response (S709). The push response generation unit 512 generates a push response that includes a projection method corresponding to the segment selected by the segment selection unit 511 and the region.

The HTTP/2 communication unit 506 of the server 102 transmits an MPD response to which a push response generated by the push response generation unit 512 is attached (S710). Note that an MPD file that includes only the projection method selected by the server 102 may be generated and transmitted. Thus, the client 101 processes an MPD file that includes only a segment that the client 101 can play back. As a result, it is possible to reduce processing load when the client 101 analyzes an MPD file.

Next, the HTTP/2 communication unit 506 of the server 102 pushes a segment selected by the segment selection unit 511 (S711). Then, the server 102 ends processing.

On the other hand, in the case of "NO" in S707, the segment selection unit 511 of the server 102 selects, in S712, a segment that covers the entire region of omnidirectional video data according to the specified projection method. Next, the push response generation unit 512 of the server 102 generates a push response (S713). The push response generation unit 512 generates a push response that includes a projection method corresponding to the segment selected by the segment selection unit 511. Note that the push response generation unit 512 may include, in the push response, a region that corresponds to the segment selected by the segment selection unit 511. Then, the server 102 proceeds to S710.

In the case of "NO" in S704, the push instruction analyzing unit 509 of the server 102 determines, in S716, whether or not the push instructions include a push instruction that specifies a region of interest in omnidirectional video data. If such a push instruction is included (YES in S716), the server 102 proceeds to S717, and if not (NO in S716), the server 102 proceeds to S722.

In S717, the segment selection unit 511 of the server 102 determines whether or not a segment that covers the specified region is held. If such a segment is held (YES in S717), the server 102 proceeds to S718, and if not (NO in S717), the server 102 proceeds to S722.

In S718, the segment selection unit 511 of the server 102 selects a segment that covers the specified region. The segment selection unit 511 may select segments generated according to one or more projection methods from among segments generated according to a plurality of projection methods.

Next, the push response generation unit 512 of the server 102 generates a push response (S719). The push response generation unit 512 generates a push response that includes a projection method corresponding to the segment selected by the segment selection unit 511, and a region of interest. Then, the server 102 proceeds to S710.

On the other hand, in S722, the segment selection unit 511 of the server 102 selects a segment that covers the entire region, of the omnidirectional video data.

Next, the push response generation unit 512 of the server 102 generates a push response that includes a projection method corresponding to the segment selected by the segment selection unit 511, and a region of interest (S723). Then, the server 102 proceeds to S710.

In the case of "NO" in S703, the segment selection unit 511 of the server 102 selects, in S726, a two-dimensional video data segment, such as a segment generated using an equirectangular projection method. Next, the push response generation unit 512 of the server 102 generates a push response that notifies the client 101 of the fact that a two-dimensional video data segment is to be pushed (S727). Then, the server 102 proceeds to S710.

Also, in S702, if it is determined that a push instruction is not attached to the MPD request (NO in S702), the HTTP/2 communication unit 506 of the server 102 transmits, in S730, a MPD file as a response (S730). Then, the server 102 ends processing.

Although the present embodiment describes an example in which the server 102 generates and holds data regarding a segment in advance, the present embodiment is also applicable to a case in which a segment is generated in real time, such as in live distribution. In such a case, the server 102 only generates a segment of the region of interest according to the projection method specified by the push instruction from the client, which leads to reduction in processing load.

Also, although the segment selection unit 511 of the server 102 in the present embodiment selects initialization segments and media segments, the present embodiment is also applicable to a case in which only initialization segments are selected and pushed.

The following supplements operations of the server 102.

When projection methods are specified

When a plurality of projection processing methods for omnidirectional video data are specified in a push instruction from the client, (S708 and S712), segments corresponding to one or more projection methods from among a plurality of different projection methods may be selected. Also, when segments corresponding to a certain projection method are to be selected, a plurality of segments of different bit streams may be selected.

Also, the server 102 may select any projection method based on the compression efficiency and file size of each projection method.

When no projection method is specified

In the present embodiment, if no projection method is specified (S718 and S722), the segment selection unit 511 may selects segments generated according to a plurality of projection methods, or segments generated according to a single projection method.

When a region of interest is specified

In the present embodiment, when a region of interest is specified (S708 and S718), one segment or a plurality of segments may be selected from among a plurality of segments that cover the region of interest. Note that, if the specified region of interest lies across a plurality of bit streams, the plurality of bit streams may be selected, and segments of the bit streams may be pushed.

Also, if there are a plurality of segments that include the specified region of interest, one or all of the segments may be selected and transmitted. For example, when using scalable encoding, it is possible to generate a low-resolution segment that covers the entire region and a high-resolution segment that covers the region of interest. If a high-resolution segment that covers a region of interest is pushed, a user using the client 101 can view the region of interest at a high resolution. If a low-resolution segment that covers the entire region is pushed, a user using the client 101 can view a seamless moving image even when a region of interest is changed.

By pushing both a high-resolution segment and a low-resolution segment, it is possible to realize both high-resolution view of a region of interest and seamless view of a moving image when a region of interest is changed.

When a region of interest is not specified

In the present embodiment, if there is no push instruction that specifies a region of interest (S712, S722, and S726), the segment selection unit 511 may select one or more segments so as to cover the entire region. As a result of the segment selection unit 511 pushing a segment so as to cover the entire region, the client 101 can smoothly start showing a view of any region of interest, and smoothly switch a region of interest to another.

Also, instead of selecting a segment that includes the entire region, the segment selection unit 511 may select and push a segment of a region that is recommended by the server. Here, a segment recommended by the server may be a region recommended by a person who generated the content of omnidirectional video data, or a region that is viewed by a large number of users, determined based on the access logs of other users. As a result, the client 101 can realize a high-quality view of omnidirectional video data. In addition, if a segment that includes the entire region of omnidirectional video data is pushed, the client 101 can smoothly switch between a high-quality view of omnidirectional video data and a view of a region of interest.

As described above, the server 102 is an information processing apparatus that pushes image data, for which there are a plurality of projection methods, to the client 101. Upon the communication unit 409 receiving a push instruction that instructs to push image data, the server 102 controls the communication unit 409 to push a segment related to the image data to the client 101. Here, if information regarding a projection method that can be handled by the client 101 is included in the push instruction, the server 102 controls the communication unit 409 to push, to the client 101, a segment of the image data projected onto a two-dimensional plane using the projection method. Therefore, the server 102 can divide image data that has been developed on a two-dimensional plane using a projection method that can be handled by the client 101, into segments, and transmits the segments to the client 101.

Communication Sequence

Next, the following describes a sequence of communication between the client 101 and the server 102 with reference to FIG. 12.

The push instruction generation unit 313 of the client 101 generates a push instruction that is used to acquire omnidirectional video data (M801). This processing is similar to the processing performed in S605 or S618 in FIG. 10A.

In M802, the client 101 transmits an MPD request to which the push instruction is attached, to the server 102. This processing is similar to the processing performed by the client 101 in S606 and the processing performed by the server 102 in S701.

In M803, the server 102 selects a segment that is to be pushed, based on the received push instruction. This processing is similar to the processing performed in S708, S712, S718, S722, or S726.

In M804, the server 102 generates a push response. This processing is similar to the processing performed in S709, S713, S719, S723, or S727.

In M805, the server 102 transmits an MPD response to which the push response is attached, to the client 101. This processing is similar to the processing performed by the server 102 in S710, and the processing performed by the client 101 in S607.

In M806, the server 102 pushes initialization segments to the client 101. This processing is similar to the processing performed by the client 101 in S610, and the processing performed by the server 102 in S711.

In M807, the server 102 pushes media segments to the client 101. This processing is also similar to the processing performed by the client 101 in S610, and the processing performed by the server 102 in S711.

In M808, the client 101 renders the received segments. This processing is similar to the processing performed in S612.

In M809, the client 101 displays and plays back the rendered segments on the display unit 205. This processing is similar to the processing performed in S613.

After finishing playing back all of the segments that are based on the push instruction transmitted in M802, if the client 101 additionally receives other segments, the client 101 transmits a segment request and a push instruction to the server 102 again. That is, in M810, the client 101 transmits a segment request to which a push instruction is attached, to the server 102. For example, the client 101 transmits such a segment request when instructed by a user to play back content.

Next, the server 102 transmits media segments to which a push response is attached, to the client 101 (M811). Furthermore, the server 102 pushes media segments to the client 101 (M812).

As described above, according to embodiments of the present invention, the client 101 controls the acquisition of a region of interest and the surrounding region thereof, using a logical stream. Thus, it is possible to perform more precise control without consuming the bandwidth of a network. As a result, it is possible to seamlessly switch between videos of a region that is of interest to the user.

Also, according to the present embodiment, the client 101 transmits, to the server, a push instruction that requests the server to push omnidirectional video data. Thus, by receiving omnidirectional video data pushed from the server 102, the client 101 can reduce a playback delay.

Furthermore, by providing the server 102 with a push instruction specifying a projection method that the client 101 can handle, the client 101 can increase the probability of receiving omnidirectional video data that the client can play back. As a result, a view of a video that is as smooth as possible can be realized even if bandwidth is limited.

Furthermore, the client 101 transmits a region of interest to the server 102. Thus, the client can increase the probability of receiving, from the server, omnidirectional video data of a region that is desired by the client. As a result, a view of a video of a region of interest that is as smooth as possible can be realized even if bandwidth is limited.

Although the above embodiment mainly describes an example in which omnidirectional video data is pushed, the effect can also be achieved in a case where image data other than omnidirectional video data (which may be a still image) is transmitted. For example, the effect of the configuration according to the present embodiment can also be achieved in the case of transmitting image data captured using a fish-eye lens, image data captured using an ultra wide-angle lens, or partial omnidirectional image data from which image data of some regions thereof has been removed. Since there are a plurality of projection methods (development methods), it can also be said that there are a plurality of display methods. The server can also develop such image data, for which there are a plurality of projection methods other than the omnidirectional video projection method, onto a two-dimensional plane using a projection method that is suitable for the client, and pushes it to the client, by receiving a transmitted push instruction that includes information regarding the projection method. Although FIG. 7 and the above embodiment mainly describe an example in which the server 102 is notified of a projection method that can be handled by the client 101, the present invention is not limited to such an embodiment. For example, the server 102 may be notified of a projection method selected by a user from among a plurality of projection methods that can be handled by the client 101. When the client 101 is to request omnidirectional video data that has not been subjected to projection processing (development processing), "projection_type="none"" shown in FIG. 7 may be written. When the client 101 is to request omnidirectional video data that has not been subjected to projection processing (development processing), the client 101 may make a push request without "projection_type" shown in FIG. 7. In this case, if the server 102 receives a push request without "projection_type", the server 102 pushes, to the client 101, omnidirectional video data that has not been subjected to projection processing.

The present invention makes it possible to provide, when there are a plurality of methods for projecting image data, a client with the image data in a form that is suitable for the client.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus that receives image data from a server apparatus, comprising:
   one or more processors; and
   one or more memories in communication with the one or more processors and including instructions stored thereon that, when executed by the one or more processors, cause the information processing apparatus to function as:
   a generation unit configured to generate a push instruction that includes identification information regarding one or more projection methods of a plurality of projection methods that are applicable to a projection target image;
   a transmitting unit configured to transmit a push instruction generated by the generation unit to the server apparatus; and
   a receiving unit configured to receive image data pushed from the server apparatus in response to a push instruction transmitted by the transmitting unit, the image data being generated by projecting a projection target image, using a projection method that is decided based on identification information that is included in the push instruction.

2. The information processing apparatus according to claim 1, wherein
   the receiving unit receives, from the server apparatus, a segment of image data generated by projecting the projection target image onto a two-dimensional plane, using a projection method that is decided based on identification information that is included in the push instruction.

3. The information processing apparatus according to claim 1, wherein
   the generation unit generates a push instruction that includes identification information regarding at least one projection method that can be handled by the information processing apparatus.

4. The information processing apparatus according to claim 1, wherein the instructions, when executed by the one or more processors, further cause the information processing apparatus to function as a display control unit configured to cause a display unit to display an image corresponding to image data received by the receiving unit.

5. The information processing apparatus according to claim 1, wherein
the projection target image is an omnidirectional image that includes images in all directions in a three-dimensional space, and
the projection methods include a method for projecting the omnidirectional image onto a two-dimensional plane by projecting the omnidirectional image onto a cylinder, a polyhedron, or a cone.

6. The information processing apparatus according to claim 5, wherein
the information processing apparatus further comprises a determination unit configured to determine whether or not the information processing apparatus develops an omnidirectional video, and
upon the determination unit determining that the information processing apparatus does not develop omnidirectional image, the generation unit generates a push instruction that includes identification information regarding one or more projection methods.

7. The information processing apparatus according to claim 1, wherein
the generation unit generates a push instruction that includes identification information selected from among one or more pieces of identification information regarding one or more projection methods, written in an MPD (Media Presentation Description).

8. The information processing apparatus according to claim 1, wherein
the generation unit generates a push instruction that further includes information indicating a region of interest, and
the receiving unit receives image data pushed from the server apparatus in response to the push instruction, the image data being generated by projecting a region of interest of a projection target image, using a projection method that is decided based on identification information that is included in the push instruction.

9. An information processing apparatus that pushes image data, comprising:
one or more processors; and
one or more memories in communication with the one or more processors and including instructions stored thereon that, when executed by the one or more processors, cause the information processing apparatus to function as:
a receiving unit configured to receive, from a client apparatus, a push instruction that includes identification information regarding one or more projection methods of a plurality of projection methods that are applicable to a projection target image;
a deciding unit configured to decide a projection method that is to be applied to a projection target image to generate image data that is to be pushed to the client apparatus, based on identification information regarding one or more projection methods included in the push instruction; and
a transmitting unit configured to push, to the client apparatus, image data generated as a result of the projection method, decided by the deciding unit, being applied to the projection target image.

10. The information processing apparatus according to claim 9, wherein
the projection target image is an omnidirectional image that includes images in all directions in a three-dimensional space, and
the projection methods include a method for projecting the omnidirectional image onto a two-dimensional plane by projecting the omnidirectional image onto a cylinder, a polyhedron, or a cone.

11. The information processing apparatus according to claim 9, wherein
the information processing apparatus further comprises a determination unit configured to determine whether or not projection processing is to be executed on the projection target image by the information processing apparatus, based on a push instruction from the client apparatus,
if the determination unit determines that projection processing is to be executed on the projection target image by the information processing apparatus, the transmitting unit pushes, to the client apparatus, image data generated as a result of the projection image being projected using a projection method that is decided by the deciding unit, and
if the determination unit determines that projection processing is not to be executed on the projection target image by the information processing apparatus, the transmitting unit pushes the projection target image to the client apparatus.

12. The information processing apparatus according to claim 9, wherein
the receiving unit receives a push instruction that includes identification information selected from among one or more pieces of identification information regarding one or more projection methods, written in an MPD (Media Presentation Description).

13. The information processing apparatus according to claim 9, wherein
if information that indicates a region of interest is included in the push instruction, the transmitting unit pushes, to the client apparatus, image data generated by projecting a region of interest of a projection target image, using a projection method that is decided based on identification information that is included in the push instruction.

14. A method for receiving image data, comprising:
generating a push instruction that includes identification information regarding one or more projection methods of a plurality of projection methods that are applicable to a projection target image;
transmitting the generated push instruction to a server apparatus; and
receiving image data pushed from the server apparatus in response to the transmitted push instruction, the image data being generated by projecting a projection target image, using a projection method that is decided based on identification information that is included in the push instruction.

15. A method for transmitting image data, comprising:
receiving, from a client apparatus, a push instruction that includes identification information regarding one or more projection methods of a plurality of projection methods that are applicable to a projection target image;
deciding a projection method that is to be applied to a projection target image so that image data that is to be pushed to the client apparatus is generated, based on identification information regarding one or more projection methods included in the received push instruction; and pushing, to the client apparatus, image data generated as a result of the decided projection method being applied to the projection target image.

16. A non-transitory computer-readable storage medium storing a program for causing a computer to execute a method for receiving image data, the method comprising:

generating a push instruction that includes identification information regarding one or more projection methods of a plurality of projection methods that are applicable to a projection target image;

transmitting the generated push instruction to a server apparatus; and receiving image data pushed from the server apparatus in response to the transmitted push instruction, the image data being generated by projecting a projection target image, using a projection method that is decided based on identification information that is included in the push instruction.

17. A non-transitory computer-readable storage medium storing a program for causing a computer to execute a method for transmitting image data, the method comprising:

receiving, from a client apparatus, a push instruction that includes identification information regarding one or more projection methods of a plurality of projection methods that are applicable to a projection target image;

deciding a projection method that is to be applied to a projection target image so that image data that is to be pushed to the client apparatus is generated, based on identification information regarding one or more projection methods included in the received push instruction; and pushing, to the client apparatus, image data generated as a result of the decided projection method being applied to the projection target image.

* * * * *